United States Patent
Biswas et al.

(10) Patent No.: US 11,972,194 B2
(45) Date of Patent: Apr. 30, 2024

(54) METHOD FOR DETERMINING PATTERNING DEVICE PATTERN BASED ON MANUFACTURABILITY

(71) Applicant: ASML NETHERLANDS B.V., Veldhoven (NL)

(72) Inventors: Roshni Biswas, San Jose, CA (US); Rafael C. Howell, Santa Clara, CA (US); Cuiping Zhang, Fremont, CA (US); Ningning Jia, Shenzhen (CN); Jingjing Liu, San Jose, CA (US); Quan Zhang, San Jose, CA (US)

(73) Assignee: ASML NETHERLANDS B.V., Veldhoven (NL)

( * ) Notice: Subject to any disclaimer, the term of this patent is extended or adjusted under 35 U.S.C. 154(b) by 0 days.

(21) Appl. No.: 18/089,848

(22) Filed: Dec. 28, 2022

(65) Prior Publication Data

US 2023/0141799 A1    May 11, 2023

Related U.S. Application Data

(63) Continuation of application No. 17/297,801, filed as application No. PCT/EP2019/079562 on Oct. 29, 2019, now Pat. No. 11,580,289.

(Continued)

(51) Int. Cl.
*G06F 30/30* (2020.01)
*G03F 7/00* (2006.01)
(Continued)

(52) U.S. Cl.
CPC ........ *G06F 30/398* (2020.01); *G03F 7/70441* (2013.01); *G03F 7/705* (2013.01);
(Continued)

(58) Field of Classification Search
None
See application file for complete search history.

(56) References Cited

U.S. PATENT DOCUMENTS

| 5,229,872 A | 7/1993 | Mumola |
| 6,046,792 A | 4/2000 | Van Der Werf et al. |
| (Continued) | | |

FOREIGN PATENT DOCUMENTS

| CN | 102122115 | 7/2011 |
| TW | 201606452 | 2/2016 |
| WO | 2017091339 | 6/2017 |

OTHER PUBLICATIONS

International Search Report and Written Opinion issued in corresponding PCT Patent Application No. PCT/EP2019/079562, dated Mar. 6, 2020.

(Continued)

*Primary Examiner* — Leigh M Garbowski
(74) *Attorney, Agent, or Firm* — Pillsbury Winthrop Shaw Pittman LLP

(57) ABSTRACT

A method for determining a patterning device pattern. The method includes obtaining (i) an initial patterning device pattern having at least one feature, and (ii) a desired feature size of the at least one feature, obtaining, based on a patterning process model, the initial patterning device pattern and a target pattern for a substrate, a difference value between a predicted pattern of the substrate image by the initial patterning device and the target pattern for the substrate, determining a penalty value related the manufacturability of the at least one feature, wherein the penalty value varies as a function of the size of the at least one feature, and determining the patterning device pattern based on the initial patterning device pattern and the desired feature size such that a sum of the difference value and the penalty value is reduced.

20 Claims, 16 Drawing Sheets

Related U.S. Application Data

(60) Provisional application No. 62/773,475, filed on Nov. 30, 2018.

(51) Int. Cl.
  *G03F 7/20* (2006.01)
  *G06F 30/392* (2020.01)
  *G06F 30/398* (2020.01)
  *G06F 119/18* (2020.01)

(52) U.S. Cl.
  CPC ........ *G03F 7/70625* (2013.01); *G06F 30/392* (2020.01); *G06F 2119/18* (2020.01)

(56) References Cited

U.S. PATENT DOCUMENTS

| | | | |
|---|---|---|---|
| 7,147,976 B2 | 12/2006 | Liebmann et al. | |
| 7,480,449 B2 | 1/2009 | Chou et al. | |
| 7,587,704 B2 | 9/2009 | Ye et al. | |
| 7,703,069 B1 | 4/2010 | Liu et al. | |
| 8,191,018 B1* | 5/2012 | Molesa | H05K 3/0005 700/121 |
| 8,200,468 B2 | 6/2012 | Ye et al. | |
| 8,423,928 B2* | 4/2013 | Ghan | G03F 7/70466 716/55 |
| 8,539,390 B2 | 9/2013 | Inoue et al. | |
| 8,584,056 B2 | 11/2013 | Chen et al. | |
| 9,111,062 B2 | 8/2015 | Chen et al. | |
| 9,256,709 B2* | 2/2016 | Yu | G03F 1/36 |
| 9,495,507 B2* | 11/2016 | Yu | G03F 1/36 |
| 9,588,438 B2 | 3/2017 | Hsu et al. | |
| 9,977,856 B2 | 5/2018 | Robles | |
| 10,210,295 B2 | 2/2019 | Rosenbluth | |
| 10,620,547 B2 | 4/2020 | Moon et al. | |
| 10,657,213 B2 | 5/2020 | Ungar | |
| 10,915,686 B2 | 2/2021 | Rosenbluth | |
| 10,990,003 B2 | 4/2021 | Hsu et al. | |
| 11,232,249 B2* | 1/2022 | Zhang | G06F 30/398 |
| 11,544,440 B2* | 1/2023 | Van Den Brink | G03F 1/36 |
| 11,580,289 B2* | 2/2023 | Biswas | G03F 7/705 |
| 2007/0011644 A1 | 1/2007 | Abrams et al. | |
| 2007/0031745 A1 | 2/2007 | Ye et al. | |
| 2007/0050749 A1 | 3/2007 | Ye et al. | |
| 2008/0301620 A1 | 12/2008 | Ye et al. | |
| 2008/0309897 A1 | 12/2008 | Wong et al. | |
| 2009/0157360 A1 | 6/2009 | Ye et al. | |
| 2010/0162197 A1 | 6/2010 | Ye et al. | |
| 2010/0180251 A1 | 7/2010 | Ye et al. | |
| 2011/0099526 A1 | 4/2011 | Liu | |
| 2011/0230999 A1 | 9/2011 | Chen et al. | |
| 2012/0113404 A1 | 5/2012 | Hsu et al. | |
| 2017/0147733 A1 | 5/2017 | Rosenbluth | |
| 2017/0184979 A1 | 6/2017 | Hsu et al. | |
| 2017/0357911 A1 | 12/2017 | Liu et al. | |
| 2020/0143528 A1 | 1/2020 | Kulkarni | |
| 2020/0380362 A1 | 12/2020 | Cao et al. | |
| 2021/0383529 A1* | 12/2021 | Kris | G06T 7/0004 |

OTHER PUBLICATIONS

Poonawla, A. et al.: "Mask Design for Optical Microlithography—An Inverse Imaging Problem", IEEE Transactions on Image Processing, vol. 16, No. 3, pp. 774-788 (2007).

Spence, C. et al.: "Manufacturing Challenges for Curvilinear Masks", Proc. of SPIE, vol. 10451 (Oct. 16, 2017).

Spence, C. et al.: "Full-Chip Lithography Simulation and Design Analysis—How OPC is Changing IC Design", Proc. of SPIE, vol. 5751, pp. 1-14 (2005).

Shen, Y. et al.: "Level-Set-Based Inverse Lithography For Photomask Synthesis", Optics Express, vol. 17, pp. 23690-23701 (2009).

* cited by examiner

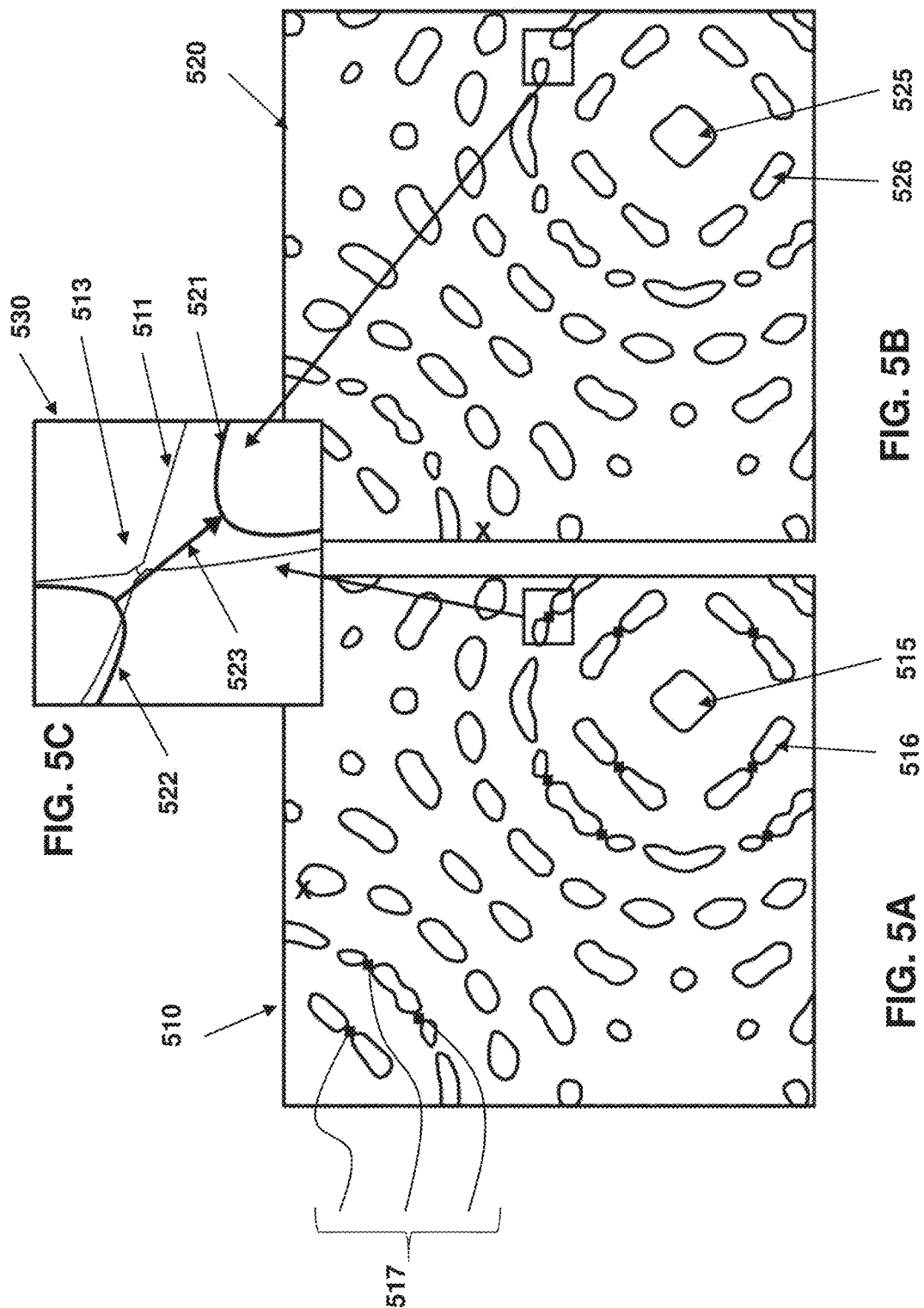

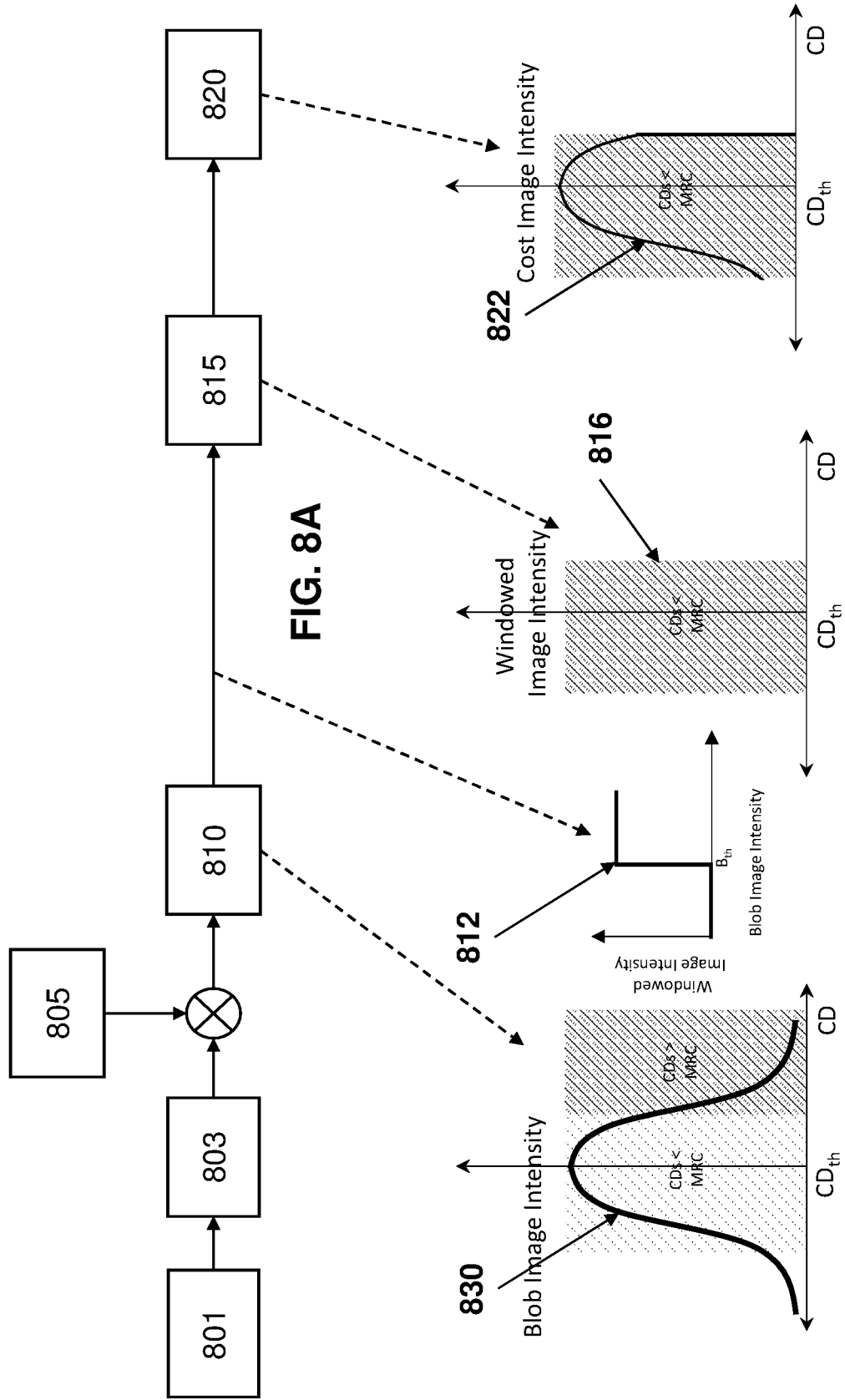

METHOD FOR DETERMINING PATTERNING DEVICE PATTERN BASED ON MANUFACTURABILITY

This application is a continuation of U.S. patent application Ser. No. 17/297,801, filed on May 27, 2021, which is the U.S. national phase entry of PCT Patent Application No. PCT/EP2019/079562, filed on Oct. 29, 2019, which claims the benefit of priority of U.S. Provisional Patent Application No. 62/773,475, filed on Nov. 30, 2018, each of the foregoing applications is incorporated herein in its entirety by reference.

TECHNICAL FIELD

The description herein relates generally to apparatus and methods of a patterning process and determining patterns of patterning device corresponding to a design layout.

BACKGROUND

A lithographic projection apparatus can be used, for example, in the manufacture of integrated circuits (ICs). In such a case, a patterning device (e.g., a mask) may contain or provide a pattern corresponding to an individual layer of the IC ("design layout"), and this pattern can be transferred onto a target portion (e.g. comprising one or more dies) on a substrate (e.g., silicon wafer) that has been coated with a layer of radiation-sensitive material ("resist"), by methods such as irradiating the target portion through the pattern on the patterning device. In general, a single substrate contains a plurality of adjacent target portions to which the pattern is transferred successively by the lithographic projection apparatus, one target portion at a time. In one type of lithographic projection apparatuses, the pattern on the entire patterning device is transferred onto one target portion in one go; such an apparatus is commonly referred to as a stepper. In an alternative apparatus, commonly referred to as a step-and-scan apparatus, a projection beam scans over the patterning device in a given reference direction (the "scanning" direction) while synchronously moving the substrate parallel or anti-parallel to this reference direction. Different portions of the pattern on the patterning device are transferred to one target portion progressively. Since, in general, the lithographic projection apparatus will have a reduction ratio M (e.g., 4), the speed F at which the substrate is moved will be 1/M times that at which the projection beam scans the patterning device. More information with regard to lithographic devices as described herein can be gleaned, for example, from U.S. Pat. No. 6,046,792, incorporated herein by reference.

Prior to transferring the pattern from the patterning device to the substrate, the substrate may undergo various procedures, such as priming, resist coating and a soft bake. After exposure, the substrate may be subjected to other procedures ("post-exposure procedures"), such as a post-exposure bake (PEB), development, a hard bake and measurement/inspection of the transferred pattern. This array of procedures is used as a basis to make an individual layer of a device, e.g., an IC. The substrate may then undergo various processes such as etching, ion-implantation (doping), metallization, oxidation, chemo-mechanical polishing, etc., all intended to finish off the individual layer of the device. If several layers are required in the device, then the whole procedure, or a variant thereof, is repeated for each layer. Eventually, a device will be present in each target portion on the substrate. These devices are then separated from one another by a technique such as dicing or sawing, whence the individual devices can be mounted on a carrier, connected to pins, etc.

Thus, manufacturing devices, such as semiconductor devices, typically involves processing a substrate (e.g., a semiconductor wafer) using a number of fabrication processes to form various features and multiple layers of the devices. Such layers and features are typically manufactured and processed using, e.g., deposition, lithography, etch, chemical-mechanical polishing, and ion implantation. Multiple devices may be fabricated on a plurality of dies on a substrate and then separated into individual devices. This device manufacturing process may be considered a patterning process. A patterning process involves a patterning step, such as optical and/or nanoimprint lithography using a patterning device in a lithographic apparatus, to transfer a pattern on the patterning device to a substrate and typically, but optionally, involves one or more related pattern processing steps, such as resist development by a development apparatus, baking of the substrate using a bake tool, etching using the pattern using an etch apparatus, etc.

As noted, lithography is a central step in the manufacturing of device such as ICs, where patterns formed on substrates define functional elements of the devices, such as microprocessors, memory chips, etc. Similar lithographic techniques are also used in the formation of flat panel displays, micro-electro mechanical systems (MEMS) and other devices.

As semiconductor manufacturing processes continue to advance, the dimensions of functional elements have continually been reduced while the amount of functional elements, such as transistors, per device has been steadily increasing over decades, following a trend commonly referred to as "Moore's law". At the current state of technology, layers of devices are manufactured using lithographic projection apparatuses that project a design layout onto a substrate using illumination from a deep-ultraviolet illumination source, creating individual functional elements having dimensions well below 100 nm, i.e. less than half the wavelength of the radiation from the illumination source (e.g., a 193 nm illumination source).

This process in which features with dimensions smaller than the classical resolution limit of a lithographic projection apparatus are printed, is commonly known as low-$k_1$ lithography, according to the resolution formula $CD=k_1 \times \lambda/NA$, where $\lambda$ is the wavelength of radiation employed (currently in most cases 248 nm or 193 nm), NA is the numerical aperture of projection optics in the lithographic projection apparatus, CD is the "critical dimension"—generally the smallest feature size printed—and $k_1$ is an empirical resolution factor. In general, the smaller $k_1$ the more difficult it becomes to reproduce a pattern on the substrate that resembles the shape and dimensions planned by a designer in order to achieve particular electrical functionality and performance. To overcome these difficulties, sophisticated fine-tuning steps are applied to the lithographic projection apparatus, the design layout, or the patterning device. These include, for example, but not limited to, optimization of NA and optical coherence settings, customized illumination schemes, use of phase shifting patterning devices, optical proximity correction (OPC, sometimes also referred to as "optical and process correction") in the design layout, or other methods generally defined as "resolution enhancement techniques" (RET). The term "projection optics" as used herein should be broadly interpreted as encompassing various types of optical systems, including refractive optics, reflective optics, apertures and catadioptric optics, for example. The term "projection optics" may also include components operating according to any of these design types for directing, shaping or controlling the projection beam of radiation, collectively or singularly. The term "projection optics" may include any optical component in the lithographic projection apparatus, no matter where the optical component is located on an optical path of the lithographic projection apparatus. Projection optics may include optical components for shaping, adjusting and/or projecting radiation from the source before the radiation passes the patterning device, and/or optical components for shaping, adjusting and/or projecting the radiation after the radiation passes the patterning device. The projection optics generally exclude the source and the patterning device.

SUMMARY

In an embodiment, there is provided a method for determining a patterning device pattern. The method includes obtaining (i) an initial patterning device pattern having at least one feature, and (ii) a desired feature size of the at least one feature; obtaining, based on a patterning process model, the initial patterning device pattern and a target pattern for a substrate, a difference value between a predicted pattern of the substrate image by the initial patterning device and the target pattern for the substrate; determining a penalty value related the manufacturability of the at least one feature, wherein the penalty value varies as a function of the size of the at least one feature; and determining the patterning device pattern based on the initial patterning device pattern and the desired feature size such that a sum of the difference value and the penalty value is reduced.

In an embodiment, the determining the patterning device pattern is an iterative process. An iteration includes modifying the size of the at least one feature of the initial patterning device pattern; determining the penalty value corresponding to the modified size of the at least one feature; and determining whether the sum of the difference value and the penalty value is reduced.

In an embodiment, the determining the penalty value includes detecting a pattern of the initial patterning device pattern having features with sizes around the desired feature size; computing a binarized pattern of the detected pattern using a binarization function, the binarization function classifies features whose size fall in a given interval of the desired feature size; determining the penalty value based on a combination of the detected pattern and the binarized pattern, where the combination includes features of varying sizes.

In an embodiment, the detected patterns include features having sizes within a ±20% range of the desired feature size.

In an embodiment, the modifying the size of the at least one feature of the initial patterning device pattern includes increasing or decreasing the size of the at least one feature so that the sum of the difference value and the penalty value is reduced.

In an embodiment, the increasing the size of the at least one feature causes the sum of the difference value and the penalty value to be minimized.

In an embodiment, the decreasing the size of the at least one feature causes the sum of the difference value and the penalty value to be minimized.

In an embodiment, the decreasing the size of the at least one feature eliminates the at least one feature from the patterning device pattern.

In an embodiment, the difference value between the predicted pattern and the target pattern is an edge placement error between a contour of a feature of the predicted pattern and another contour of the target pattern corresponding to the contour of the predicted pattern.

In an embodiment, the initial patterning device pattern or the patterning device pattern is a curvilinear pattern.

In an embodiment, modifying the patterning device pattern comprises optical proximity corrections comprising a placement of assist features and/or contour modification.

In an embodiment, the initial patterning device pattern or the patterning device pattern is a pixelated image.

In an embodiment, the detecting pattern is based on image processing of the pixelated image of the initial patterning device pattern or the patterning device pattern.

In an embodiment, the detecting pattern includes convolving a kernel having a characteristic modulation distance with the pixelated image of the initial patterning device pattern, wherein the characteristic modulation distance corresponds to a range of value around a signal of the pixelated image.

In an embodiment, the signal is related to an intensity of a pixel of the pixelated image.

In an embodiment, the characteristic modulation distance is set to the desired feature size.

In an embodiment, the kernel is a Laplacian-of-Gaussian or a difference-of-Gaussian function.

In an embodiment, the computing the binarized pattern is based on image processing of an image of the detected pattern.

In an embodiment, the computing the binarized pattern includes identifying pixels within the image of the detected patterns based on a binarization threshold value, where the binarization threshold value classifies a pixel location belonging to a feature within a given interval of the desired size of the at least one feature.

In an embodiment, the binarized function is a sigmoid.

In an embodiment, the binarization threshold value is greater than 0.5.

In an embodiment, the penalty value is a scalar value associated with a pixel of the pixelated patterning device pattern, wherein the pixel corresponds to the at least one feature being modified.

In an embodiment, a non-transitory computer program product comprising machine-readable instructions for causing a processor to cause performance of the steps of any of aforementioned methods.

BRIEF DESCRIPTION OF THE DRAWINGS

FIG. 5A illustrates an example curvilinear mask pattern obtained without applying a mask rule check (MRC) according to an embodiment.

FIG. 5B illustrates an example curvilinear mask pattern obtained when MRC is applied according to an embodiment.

FIG. 5C illustrates an example comparison between a portion of mask pattern of 5A and corresponding portion of a mask pattern of 5B according to an embodiment.

FIG. 8A is an example process of generating a penalty function used to determine modifications of the initial mask pattern of FIG. 7A according to an embodiment.

FIG. 8B is an example blog image having an intensity profile that is output during the process of FIG. 8A according to an embodiment.

FIG. 8C is an example step function applied to the intensity profile of FIG. 8B according to an embodiment.

FIG. 8D is an example binarized intensity profile resulting from FIG. 8C according to an embodiment.

FIG. 8E is an example penalty function resulting from the process 8A according to an embodiment.

DETAILED DESCRIPTION

Figure 1:
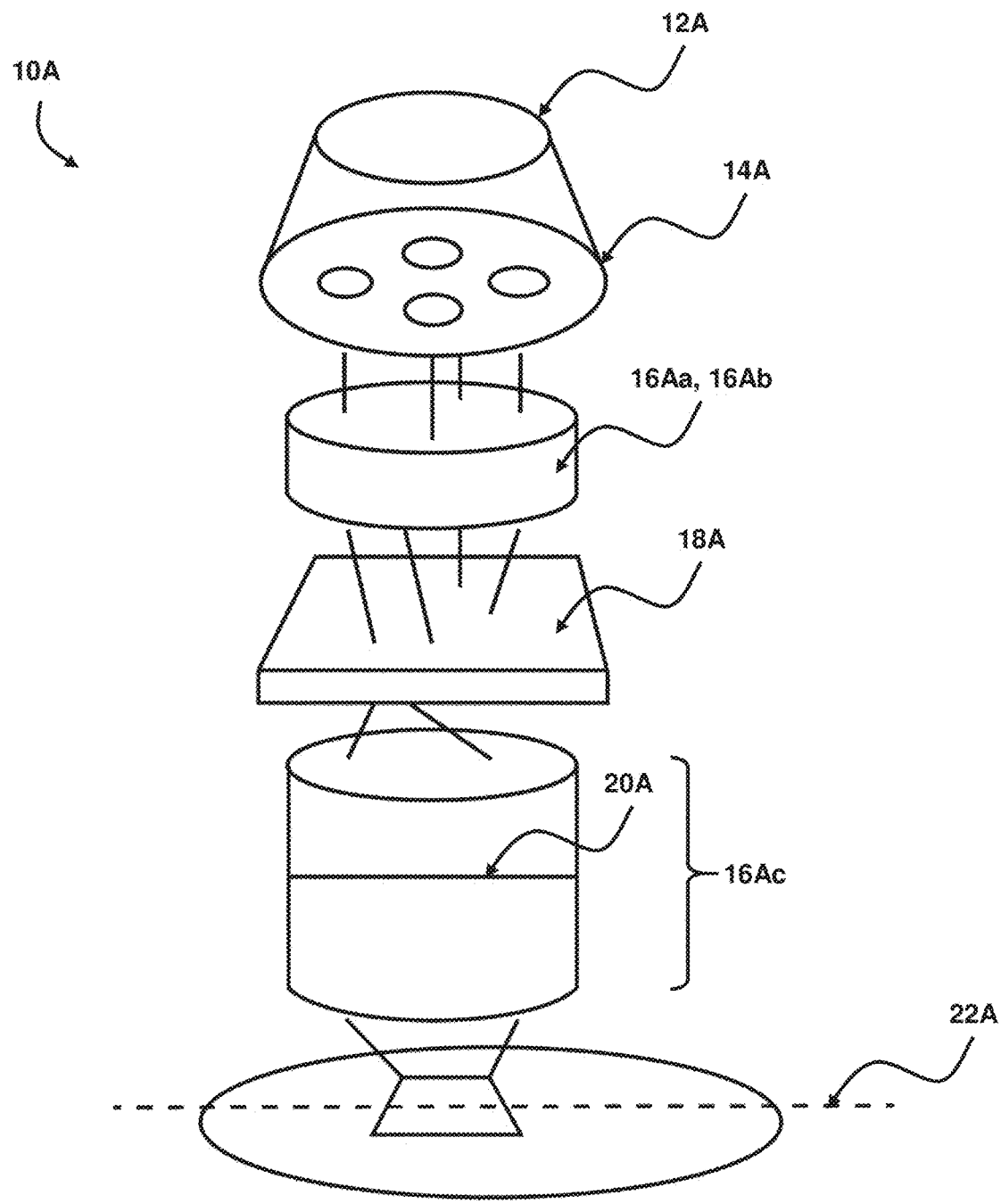
FIG. 1 shows a block diagram of various subsystems of a lithography system according to an embodiment.

Although specific reference may be made in this text to the manufacture of ICs, it should be explicitly understood that the description herein has many other possible applications. For example, it may be employed in the manufacture of integrated optical systems, guidance and detection patterns for magnetic domain memories, liquid-crystal display panels, thin-film magnetic heads, etc. The skilled artisan will appreciate that, in the context of such alternative applications, any use of the terms "reticle", "wafer" or "die" in this text should be considered as interchangeable with the more general terms "mask", "substrate" and "target portion", respectively.

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range of about 5-100 nm).

The patterning device can comprise, or can form, one or more design layouts. The design layout can be generated utilizing CAD (computer-aided design) programs, this process often being referred to as EDA (electronic design automation). Most CAD programs follow a set of predetermined design rules in order to create functional design layouts/patterning devices. These rules are set by processing and design limitations. For example, design rules define the space tolerance between devices (such as gates, capacitors, etc.) or interconnect lines, so as to ensure that the devices or lines do not interact with one another in an undesirable way. One or more of the design rule limitations may be referred to as "critical dimension" (CD). A critical dimension of a device can be defined as the smallest width of a line or hole or the smallest space between two lines or two holes. Thus, the CD determines the overall size and density of the designed device. Of course, one of the goals in device fabrication is to faithfully reproduce the original design intent on the substrate (via the patterning device).

The pattern layout design may include, as an example, application of resolution enhancement techniques, such as optical proximity corrections (OPC). OPC addresses the fact that the final size and placement of an image of the design layout projected on the substrate will not be identical to, or simply depend only on the size and placement of the design layout on the patterning device. It is noted that the terms "mask", "reticle", "patterning device" are utilized interchangeably herein. Also, person skilled in the art will recognize that, the term "mask," "patterning device" and "design layout" can be used interchangeably, as in the context of RET, a physical patterning device is not necessarily used but a design layout can be used to represent a physical patterning device. For the small feature sizes and high feature densities present on some design layout, the position of a particular edge of a given feature will be influenced to a certain extent by the presence or absence of other adjacent features. These proximity effects arise from minute amounts of radiation coupled from one feature to another or non-geometrical optical effects such as diffraction and interference. Similarly, proximity effects may arise from diffusion and other chemical effects during post-exposure bake (PEB), resist development, and etching that generally follow lithography.

In order to increase the chance that the projected image of the design layout is in accordance with requirements of a given target circuit design, proximity effects may be predicted and compensated for, using sophisticated numerical models, corrections or pre-distortions of the design layout. The article "Full-Chip Lithography Simulation and Design Analysis—How OPC Is Changing IC Design", C. Spence, Proc. SPIE, Vol. 5751, pp 1-14 (2005) provides an overview of current "model-based" optical proximity correction processes. In a typical high-end design almost every feature of the design layout has some modification in order to achieve high fidelity of the projected image to the target design. These modifications may include shifting or biasing of edge positions or line widths as well as application of "assist" features that are intended to assist projection of other features.

One of the simplest forms of OPC is selective bias. Given a CD vs. pitch curve, all of the different pitches could be forced to produce the same CD, at least at best focus and exposure, by changing the CD at the patterning device level. Thus, if a feature prints too small at the substrate level, the patterning device level feature would be biased to be slightly larger than nominal, and vice versa. Since the pattern transfer process from patterning device level to substrate level is non-linear, the amount of bias is not simply the measured CD error at best focus and exposure times the reduction ratio, but with modeling and experimentation an appropriate bias can be determined. Selective bias is an incomplete solution to the problem of proximity effects, particularly if it is only applied at the nominal process condition. Even though such bias could, in principle, be applied to give uniform CD vs. pitch curves at best focus and exposure, once the exposure process varies from the nominal condition, each biased pitch curve will respond differently, resulting in different process windows for the different features. A process window being a range of values of two or more process parameters (e.g., focus and radiation dose in the lithographic apparatus) under which a feature is sufficiently properly created (e.g., the CD of the feature is within a certain range such as ±10% or ±5%). Therefore, the "best" bias to give identical CD vs. pitch may even have a negative impact on the overall process window, reducing rather than enlarging the focus and exposure range within which all of the target features print on the substrate within the desired process tolerance.

Other more complex OPC techniques have been developed for application beyond the one-dimensional bias example above. A two-dimensional proximity effect is line end shortening. Line ends have a tendency to "pull back" from their desired end point location as a function of exposure and focus. In many cases, the degree of end shortening of a long line end can be several times larger than the corresponding line narrowing. This type of line end pull back can result in catastrophic failure of the devices being manufactured if the line end fails to completely cross over the underlying layer it was intended to cover, such as a polysilicon gate layer over a source-drain region. Since this type of pattern is highly sensitive to focus and exposure, simply biasing the line end to be longer than the design length is inadequate because the line at best focus and exposure, or in an underexposed condition, would be excessively long, resulting either in short circuits as the extended line end touches neighboring structures, or unnecessarily large circuit sizes if more space is added between individual features in the circuit. Since one of the goals of integrated circuit design and manufacturing is to maximize the number of functional elements while minimizing the area required per chip, adding excess spacing is an undesirable solution.

Two-dimensional OPC approaches may help solve the line end pull back problem. Extra structures (also known as "assist features") such as "hammerheads" or "serifs" may be added to line ends to effectively anchor them in place and provide reduced pull back over the entire process window. Even at best focus and exposure these extra structures are not resolved but they alter the appearance of the main feature without being fully resolved on their own. A "main feature" as used herein means a feature intended to print on a substrate under some or all conditions in the process window. Assist features can take on much more aggressive forms than simple hammerheads added to line ends, to the extent the pattern on the patterning device is no longer simply the desired substrate pattern upsized by the reduction ratio. Assist features such as serifs can be applied for many more situations than simply reducing line end pull back. Inner or outer serifs can be applied to any edge, especially two dimensional edges, to reduce corner rounding or edge extrusions. With enough selective biasing and assist features of all sizes and polarities, the features on the patterning device bear less and less of a resemblance to the final pattern desired at the substrate level. In general, the patterning device pattern becomes a pre-distorted version of the substrate-level pattern, where the distortion is intended to counteract or reverse the pattern deformation that will occur during the manufacturing process to produce a pattern on the substrate that is as close to the one intended by the designer as possible.

Another OPC technique involves using completely independent and non-resolvable assist features, instead of or in addition to those assist features (e.g., serifs) connected to the main features. The term "independent" here means that edges of these assist features are not connected to edges of the main features. These independent assist features are not intended or desired to print as features on the substrate, but rather are intended to modify the aerial image of a nearby main feature to enhance the printability and process tolerance of that main feature. These assist features (often referred to as "scattering bars" or "SBAR") can include sub-resolution assist features (SRAF) which are features outside edges of the main features and sub-resolution inverse features (SRIF) which are features scooped out from inside the edges of the main features. The presence of a SBAR adds yet another layer of complexity to a patterning device pattern. A simple example of a use of scattering bars is where a regular array of non-resolvable scattering bars is drawn on both sides of an isolated line feature, which has the effect of making the isolated line appear, from an aerial image standpoint, to be more representative of a single line within an array of dense lines, resulting in a process window much closer in focus and exposure tolerance to that of a dense pattern. The common process window between such a decorated isolated feature and a dense pattern will have a larger common tolerance to focus and exposure variations than that of a feature drawn as isolated at the patterning device level.

An assist feature may be viewed as a difference between features on a patterning device and features in the design layout. The terms "main feature" and "assist feature" do not imply that a particular feature on a patterning device must be labeled as one or the other.

The term "mask" or "patterning device" as employed in this text may be broadly interpreted as referring to a generic patterning device that can be used to endow an incoming radiation beam with a patterned cross-section, corresponding to a pattern that is to be created in a target portion of the substrate; the term "light valve" can also be used in this context. Besides the classic mask (transmissive or reflective; binary, phase-shifting, hybrid, etc.), examples of other such patterning devices include:

a programmable mirror array. An example of such a device is a matrix-addressable surface having a viscoelastic control layer and a reflective surface. The basic principle behind such an apparatus is that (for example) addressed areas of the reflective surface reflect incident radiation as diffracted radiation, whereas unaddressed areas reflect incident radiation as undiffracted radiation. Using an appropriate filter, the said undiffracted radiation can be filtered out of the reflected beam, leaving only the diffracted radiation behind; in this manner, the beam becomes patterned according to the addressing pattern of the matrix-addressable surface. The required matrix addressing can be performed using suitable electronic means.

a programmable LCD array. An example of such a construction is given in U.S. Pat. No. 5,229,872, which is incorporated herein by reference.

As a brief introduction, FIG. 1 illustrates an exemplary lithographic projection apparatus 10A. Major components are a radiation source 12A, which may be a deep-ultraviolet excimer laser source or other type of source including an extreme ultra violet (EUV) source (as discussed above, the lithographic projection apparatus itself need not have the radiation source), illumination optics which, e.g., define the partial coherence and which may include optics 14A, 16Aa and 16Ab that shape radiation from the source 12A; a patterning device 18A; and transmission optics 16Ac that project an image of the patterning device pattern onto a substrate plane 22A. An adjustable filter or aperture 20A at the pupil plane of the projection optics may restrict the range of beam angles that impinge on the substrate plane 22A, where the largest possible angle defines the numerical aperture of the projection optics NA=n sin(Θmax), wherein n is the refractive index of the media between the substrate and the last element of the projection optics, and Θmax is the largest angle of the beam exiting from the projection optics that can still impinge on the substrate plane 22A.

In a lithographic projection apparatus, a source provides illumination (i.e. radiation) to a patterning device and projection optics direct and shape the illumination, via the patterning device, onto a substrate. The projection optics may include at least some of the components 14A, 16Aa, 16Ab and 16Ac. An aerial image (AI) is the radiation intensity distribution at substrate level. A resist layer on the substrate is exposed and the aerial image is transferred to the resist layer as a latent "resist image" (RI) therein. The resist image (RI) can be defined as a spatial distribution of solubility of the resist in the resist layer. A resist model can be used to calculate the resist image from the aerial image, an example of which can be found in U.S. Patent Application Publication No. US 2009-0157360, the disclosure of which is hereby incorporated by reference in its entirety. The resist model is related only to properties of the resist layer (e.g., effects of chemical processes which occur during exposure, PEB and development). Optical properties of the lithographic projection apparatus (e.g., properties of the source, the patterning device and the projection optics) dictate the aerial image. Since the patterning device used in the lithographic projection apparatus can be changed, it may be desirable to separate the optical properties of the patterning device from the optical properties of the rest of the lithographic projection apparatus including at least the source and the projection optics.

One aspect of understanding a lithographic process is understanding the interaction of the radiation and the patterning device. The electromagnetic field of the radiation after the radiation passes the patterning device may be determined from the electromagnetic field of the radiation before the radiation reaches the patterning device and a function that characterizes the interaction. This function may be referred to as the mask transmission function (which can be used to describe the interaction by a transmissive patterning device and/or a reflective patterning device).

The mask transmission function may have a variety of different forms. One form is binary. A binary mask transmission function has either of two values (e.g., zero and a positive constant) at any given location on the patterning device. A mask transmission function in the binary form may be referred to as a binary mask. Another form is continuous. Namely, the modulus of the transmittance (or reflectance) of the patterning device is a continuous function of the location on the patterning device. The phase of the transmittance (or reflectance) may also be a continuous function of the location on the patterning device. A mask transmission function in the continuous form may be referred to as a continuous transmission mask (CTM). For example, the CTM may be represented as a pixelated image, where each pixel may be assigned a value between 0 and 1 (e.g., 0.1, 0.2, 0.3, etc.) instead of binary value of either 0 or 1. An example CTM flow and its details may be found in commonly assigned U.S. Pat. No. 8,584,056, the disclosure of which is incorporated herein by reference in its entirety.

According to an embodiment, the design layout may be optimized as a continuous transmission mask ("CTM optimization"). In this optimization, the transmission at all the locations of the design layout is not restricted to a number of discrete values. Instead, the transmission may assume any value within an upper bound and a lower bound. More details may be found in commonly assigned U.S. Pat. No. 8,584,056, the disclosure of which is hereby incorporated by reference in its entirety. A continuous transmission mask is very difficult, if not impossible, to implement on the patterning device. However, it is a useful tool because not restricting the transmission to a number of discrete values makes the optimization much faster. In an EUV lithographic projection apparatus, the patterning device may be reflective. The principle of CTM optimization is also applicable to a design layout to be produced on a reflective patterning device, where the reflectivity at all the locations of the design layout is not restricted to a number of discrete values. Therefore, as used herein, the term "continuous transmission mask" may refer to a design layout to be produced on a reflective patterning device or a transmissive patterning device. The CTM optimization may be based on a three-dimensional mask model that takes in account thick-mask effects. The thick-mask effects arise from the vector nature of light and may be significant when feature sizes on the design layout are smaller than the wavelength of light used in the lithographic process. The thick-mask effects include polarization dependence due to the different boundary conditions for the electric and magnetic fields, transmission, reflectance and phase error in small openings, edge diffraction (or scattering) effects or electromagnetic coupling. More details of a three-dimensional mask model may be found in commonly assigned U.S. Pat. No. 7,703,069, the disclosure of which is hereby incorporated by reference in its entirety.

In an embodiment, assist features (sub resolution assist features and/or printable resolution assist features) may be placed into the design layout based on the design layout optimized as a continuous transmission mask. This allows identification and design of the assist feature from the continuous transmission mask.

Figure 2:
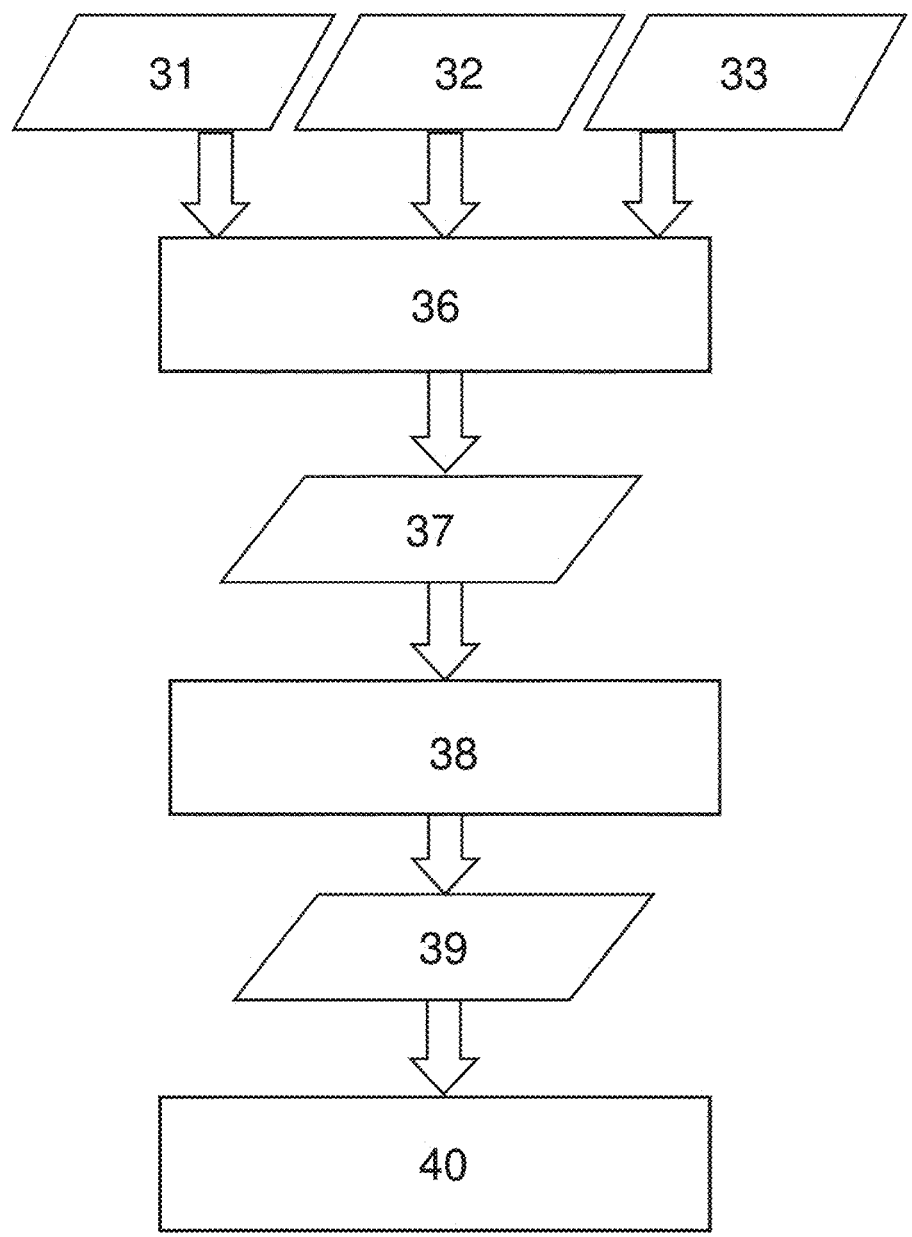
FIG. 2 illustrates a flowchart for a method of simulating at least a portion of a pattern or a characteristic of a pattern in an image according to an embodiment.

An exemplary flow chart of a method of modelling and/or simulating parts of a patterning process is illustrated in FIG. 2, for example, modelling and/or simulating at least a portion of a pattern or a characteristic of a pattern in an image (e.g., resist image, aerial image, etch image). As will be appreciated, the models may represent a different patterning process and need not comprise all the models described below.

As described above, in a lithographic projection apparatus, an illumination system provides illumination (i.e. radiation) to patterning device and projection optics directs the illumination from the patterning device onto a substrate. So, in an embodiment, the projection optics enables the formation of an aerial image (AI), which is the radiation intensity distribution at the substrate. A resist layer on the substrate is exposed and the aerial image is transferred to the resist layer as a latent "resist image" (RI) therein. The resist image (RI) can be defined as a spatial distribution of solubility of the resist in the resist layer. In an embodiment, simulation of a lithography process can simulate the production of the aerial image and/or resist image.

An illumination model 31 represents optical characteristics (including radiation intensity distribution and/or phase distribution) of an illumination mode used to generate a patterned radiation beam. The illumination model 31 can represent the optical characteristics of the illumination that include, but not limited to, numerical aperture settings, illumination sigma (σ) settings as well as any particular illumination mode shape (e.g. off-axis radiation shape such as annular, quadrupole, dipole, etc.), where a (or sigma) is outer radial extent of the illuminator.

A projection optics model 32 represents optical characteristics (including changes to the radiation intensity distribution and/or the phase distribution caused by the projection optics) of the projection optics. The projection optics model 32 may include optical aberrations caused by various factors, for example, heating of the components of the projection optics, stress caused by mechanical connections of the components of the projection optics, etc. The projection optics model 32 can represent the optical characteristics of the projection optics, including one or more selected from: an aberration, a distortion, a refractive index, a physical size, a physical dimension, an absorption, etc. Optical properties of the lithographic projection apparatus (e.g., properties of the illumination, the patterning device pattern and the projection optics) dictate the aerial image. Since the patterning device pattern used in the lithographic projection apparatus can be changed, it is desirable to separate the optical properties of the patterning device pattern from the optical properties of the rest of the lithographic projection apparatus including at least the illumination and the projection optics. The illumination model 31 and the projection optics model 32 can be combined into a transmission cross coefficient (TCC) model.

A patterning device pattern model 33 represents optical characteristics (including changes to the radiation intensity distribution and/or the phase distribution caused by a given patterning device pattern) of a patterning device pattern (e.g., a device design layout corresponding to a feature of an integrated circuit, a memory, an electronic device, etc.), which is the representation of an arrangement of features on or formed by a patterning device. The patterning device model 33 captures how the design features are laid out in the pattern of the patterning device and may include a representation of detailed physical properties of the patterning device and a patterning device pattern, as described, for example, in U.S. Pat. No. 7,587,704, which is incorporated herein in its entirety by reference.

A resist model 37 can be used to calculate the resist image from the aerial image. An example of such a resist model can be found in U.S. Pat. No. 8,200,468, which is hereby incorporated by reference in its entirety. The resist model typically describes the effects of chemical processes which occur during resist exposure, post exposure bake (PEB) and development, in order to predict, for example, contours of resist features formed on the substrate and so it typically is related only to such properties of the resist layer (e.g., effects of chemical processes which occur during exposure, post-exposure bake and development). In an embodiment, the optical properties of the resist layer, e.g., refractive index, film thickness, propagation and polarization effects— may be captured as part of the projection optics model 32.

Having these models, an aerial image 36 can be simulated from the illumination model 31, the projection optics model 32 and the patterning device pattern model 33. An aerial image (AI) is the radiation intensity distribution at substrate level. Optical properties of the lithographic projection apparatus (e.g., properties of the illumination, the patterning device and the projection optics) dictate the aerial image.

As noted above, a resist layer on a substrate is exposed by the aerial image and the aerial image is transferred to the resist layer as a latent "resist image" (RI) therein. A resist image 38 can be simulated from the aerial image 36 using a resist model 37. So, in general, the connection between the optical and the resist model is a simulated aerial image intensity within the resist layer, which arises from the projection of radiation onto the substrate, refraction at the resist interface and multiple reflections in the resist film stack. The radiation intensity distribution (aerial image intensity) is turned into a latent "resist image" by absorption of incident energy, which is further modified by diffusion processes and various loading effects. Efficient simulation methods that are fast enough for full-chip applications approximate the realistic 3-dimensional intensity distribution in the resist stack by a 2-dimensional aerial (and resist) image.

In an embodiment, the resist image can be used as an input to a post-pattern transfer process model 39. The post-pattern transfer process model 39 defines performance of one or more post-resist development processes (e.g., etch, CMP, etc.) and can produce a post-etch image 40. That is, an etch image 40 can be simulated from the resist image 36 using a post-pattern transfer process model 39.

Thus, this model formulation describes most, if not all, of the known physics and chemistry of the overall process, and each of the model parameters desirably corresponds to a distinct physical or chemical effect. The model formulation thus sets an upper bound on how well the model can be used to simulate the overall manufacturing process.

Simulation of the patterning process can, for example, predict contours, CDs, edge placement (e.g., edge placement error), pattern shift, etc. in the aerial, resist and/or etch image. That is, the aerial image 34, the resist image 36 or the etch image 40 may be used to determine a characteristic (e.g., the existence, location, type, shape, etc. of) of a pattern. Thus, the objective of the simulation is to accurately predict, for example, edge placement, and/or contours, and/or pattern shift, and/or aerial image intensity slope, and/or CD, etc. of the printed pattern. These values can be compared against an intended design to, e.g., correct the patterning process, identify where a defect is predicted to occur, etc. The intended design is generally defined as a pre-OPC design layout which can be provided in a standardized digital file format such as GDSII or OASIS or other file format.

Details of techniques and models used to transform a patterning device pattern into various lithographic images (e.g., an aerial image, a resist image, etc.), apply OPC using those techniques and models and evaluate performance (e.g., in terms of process window) are described in U.S. Patent Application Publication Nos. US 2008-0301620, 2007-0050749, 2007-0031745, 2008-0309897, 2010-0162197, 2010-0180251 and 2011-0099526, the disclosure of each of which is hereby incorporated by reference in its entirety.

As lithography nodes keep shrinking, more and more complicated patterning device pattern (interchangeably referred to as a mask for better readability) are required (e.g., curvilinear masks). The present method may be used in key layers with DUV scanners, EUV scanners, and/or other scanners. The method according to the present disclosure may be included in different aspect of the mask optimization process including source mask optimization (SMO), mask optimization, and/or OPC. For example, a source mask optimization process is described in U.S. Pat. No. 9,588,438 titled "Optimization Flows of Source, Mask and Projection Optics", which is hereby incorporated in its entirety by reference.

In an embodiment, a patterning device pattern is a curvilinear mask including curvilinear SRAFs having polygonal shapes, as opposed to that in Manhattan patterns having rectangular or staircase like shapes. A curvilinear mask may produce more accurate patterns on a substrate compared to a Manhattan pattern. However, the geometry of curvilinear SRAFs, their locations with respect to the target patterns, or other related parameters may create manufacturing restrictions, since such curvilinear shapes may not be feasible to manufacture. Hence, such restrictions may be considered by a designer during the mask design process. A detailed discussion on the limitation and challenges in manufacturing a curvilinear mask is provided in "*Manufacturing Challenges for Curvilinear Masks*" by Spence, et al., Proceeding of SPIE Volume 10451, Photomask Technology, 1045104 (16 Oct. 2017); doi: 10.1117/12.2280470, which is incorporated herein by reference in its entirety.

As mentioned earlier, a mask optimization process involves determining OPC for a design layout such as SRAFs and SRIFs placed at or around a target pattern of the design layout. A mask may be further verified for manufacturability using a mask rule check (MRC) to determine whether the OPC'ed mask satisfy a mask manufacturing process of a fabrication facility. MRC refers to the limiting conditions of a mask manufacturing process or apparatus. For example, MRC verifies that a minimum line width of the OPC modified features, or a minimum space between two adjacent OPC modified features, is within capability of the manufacturing mask-shop of a fab. In an embodiment, the MRC also includes a correction, such as a pullback, if a space/width rule is violated for bright-field/dark-field process. After the MRC related correction, the OPC modified data is sent to a mask writer (e.g., an electron beam writer, an ion beam writer, or a laser beam writer) for manufacturing the mask.

Existing approaches are configured to employ MRC for Manhattan type of patterns only. There are two problems with existing approaches. First, typically during optimization the MRC constraints or penalties guard minimum sizes and areas, and therefore do not consider a solution where a polygon is removed (e.g., for a continuous mask optimization, a polygon shrinks to nothing), and this omission can produce sub-optimal results. Second, for curvilinear layouts without simple geometries, or for layouts parameterized as images, the variables are usually not explicitly the polygon edges locations, so the edges cannot be constrained during the optimization. Furthermore, the measurement and differentiability of widths and areas defined by the polygon edges (or from features in a layout image) is complex, and a penalty cost-function based on the edges may not provide acceptable runtime or convergence. The present disclosure discusses example methods for determining mask patterns based on MRC to overcome such example problems of existing methods.

Figure 3:
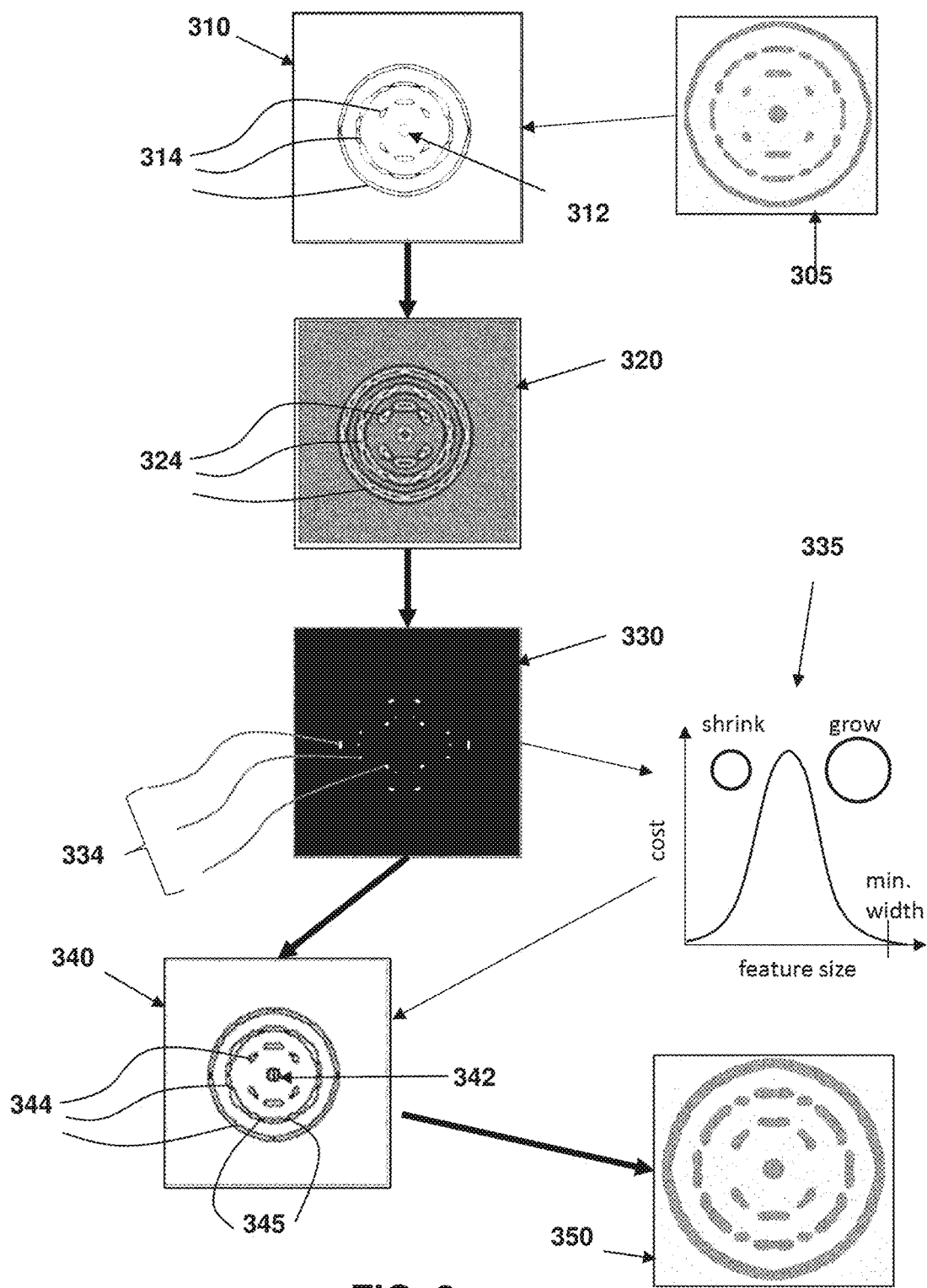
FIG. 3 illustrates an example of determining a mask pattern by modifying an initial mask pattern according to an embodiment.

FIG. 3 illustrates an example of determining a mask pattern 340 by modifying an initial mask pattern 305 (e.g., a curvilinear mask including OPC, mask variables initialized from a CTM image, etc.) based on a penalty value (e.g., in 335) associated with a manufacturing limitation of the mask manufacturing tool or process. In an embodiment, MRC limitation may be defined in terms of a geometry (e.g., size, area, etc.) of the feature to be printed on the mask.

In an embodiment, MRC comprises a plurality of rule checks (e.g., minimum feature sizes) associated with a plurality of features of the mask pattern to the manufactured. During a mask making process, if the MRC is not satisfied, the initial mask pattern may be modified to enable manufacturing of the mask via the mask manufacturing tool or process. In an embodiment, such modification may include change in a size of a feature of the initial mask pattern, curvature of the feature, etc. Modifications to the mask pattern will in turn cause changes in printed pattern on a substrate when the mask pattern is used to image the substrate via the lithographic patterning process.

In an embodiment, the modifications to mask pattern to fulfil MRC specification may cause undesirable changes in the printed pattern on the substrate. As such, in the present disclosure, any modification (e.g., increase or decrease a feature size) of the initial mask pattern to satisfy MRC is associated with a penalty value to account for undesired changes in the printed pattern on the substrate.

In an embodiment, such penalty value may be included in a cost function used during a mask optimization process. For example, a cost function may be an edge placement error which may be reduced or minimized (e.g., using a gradient decent method) during the optimization process. An edge placement error may be defined as a difference value, where the difference is computed between a contour of a printed pattern on a substrate imaged via a mask pattern (e.g., an initial mask pattern) and a contour of a target pattern (e.g., a design pattern) desired to be printed on the substrate. According to the present disclosure, the cost function may include the penalty value along with the difference value, thereby during the optimization process, a combination of the difference value and the penalty value is reduced.

In an embodiment, the initial mask pattern 305 is an input pattern for the mask optimization process based on the penalty value related to the manufacturability of the mask. In an embodiment, the initial mask pattern 305 may include a curvilinear mask pattern, a Manhattan pattern, or a combination thereof. In an embodiment, the initial mask pattern 305 may be obtained via CTM process, CTM+ process employing a level set method on an initial CTM-based curvilinear mask, CTM+ process employing a sigmoid transformation an initial CTM-based curvilinear mask, etc. The present method is not limited to a particular initial mask pattern 305.

In an example, a CTM image generated by the CTM process may be used to initialize the mask variables that can be used as the initial mask pattern 305 (an initial image), which is iteratively modified as discussed below with respect to function 335 and image 340, and a method 700 in FIG. 7A.

In an embodiment, the curvilinear mask pattern may be obtained from a continuous transmission mask (CTM+) process (an extension of CTM process) that employs a level-set method to generate curvilinear shapes of the initial mask pattern. An example of CTM process is discussed in U.S. Pat. No. 8,584,056, mentioned earlier. In an embodiment, the CTM+ process involves steps for determining, one or more characteristics of assist features of an initial mask pattern (or a mask pattern in general) using any suitable method, based on a portion or one or more characteristics thereof. For example, the one or more characteristics of assist features may be determined using a method described in U.S. Pat. No. 9,111,062, or described Y. Shen, et al., Level-Set-Based Inverse Lithography For Photomask Synthesis, Optics Express, Vol. 17, pp. 23690-23701 (2009), the disclosures of which are hereby incorporated by reference in their entirety. For example, the one or more characteristics may include one or more geometrical characteristics (e.g., absolute location, relative location, or shape) of the assist features, one or more statistical characteristics of the assist features, or parameterization of the assist features. Examples of a statistical characteristic of the assist features may include an average or variance of a geometric dimension of the assist features.

In an embodiment, a method (e.g., 700 of FIG. 7A) may be configured to generate a CTM image. For example, in a CTM generation technique, an inverse lithography problem is formulated as an optimization problem. The variables are related to values of pixels in a mask image, and lithography metric such as EPE or sidelobe printings are used as cost function. In an iteration of the optimization, the mask image is constructed from a mask image based on modifying values of mask variables and then a process model (e.g., Tachyon model) is applied to obtain optical or resist images and cost functions are computed. The cost computation then gives the gradient values that are used in the optimization solver to update variables (e.g., pixel intensities) to obtain the initial mask image 305. After several iterations during optimization, a curvilinear mask image 305 is generated, which is further used as guidance map for pattern extraction (e.g., as implemented in Tachyon SMO software). Such a mask image 305 (e.g., the CTM image) may include one or more features (e.g., a feature of a target pattern, SRAFs, SRIFs, etc.) corresponding to the target pattern to be printed on the substrate via the patterning process.

In an embodiment, a CTM generation technique may include a machine learning model trained to generate continuous tone mask based on a design layout as input. Such machine learning model may be integrated in the present method and an optimization problem may be formulated based on variables to values of pixels in a mask image as discussed above.

Further, in an embodiment, an image processing operation may be performed on the initial mask pattern 305 to identify regions that are susceptible to MRC violations. For example, such regions include regions within the image 305 where pixel intensity transitions from a high value to low value at a slower rate. In an embodiment, the image processing involves performing an edge detection operation on the initial mask pattern 305 to identify regions where MRC violation is most likely to occur. In an example, the edge detection operation involves performing a threshold-based sigmoid transformation using a range of pixel intensity values within the initial mask image. The image processing generates another a transformed image 310 that includes contours of patterns in the initial mask image 305, where the certain portions of the contours are more susceptible to MRC violations. Such an image may provide a starting image for further optimizing of the initial mask image 305. In an embodiment, the initial mask image 305 and the transformed image 310 having contours from the initial mask image 305 may interchangeably be referred as the initial mask image 310 for simplicity and better readability.

In FIG. 3, the initial mask pattern 310 (e.g., obtained from CTM or CTM+ process) includes a main feature 312 (e.g., a desired feature to be printed on the substrate) that may be surrounded by OPC such as assist features 314. In an embodiment, the main feature and the assist features 314 may have curved contours (e.g., CTM image). In an embodiment, the initial mask pattern 310 may be in the form of a pixelated image, where the features 312 and 314 are considered signals within the image. In an embodiment, when the initial mask pattern 310 is represented as a pixelated image, the initial mask pattern 310 may be interchangeably referred to as initial mask image 310. In the initial mask image 310, each pixel of the features 312 and 314 will have an intensity value. Thus, in an embodiment, a strong signal may indicate a relatively higher likelihood of presence of a feature and a weak signal may indicate a relatively lower likelihood of presence of the feature.

According to the present embodiment, image processing may be performed on the initial mask image 310 to identify one or more features or a portion of a feature of the one or more feature. The image processing operation is such that the identified feature relates to a desired size (e.g., 5 nm, 5 nm, 10 nm, etc.). In an embodiment, the identified features may be considered as strong signal, for example, features having a particular size may be considered strong signal and features having relatively higher or lower sizes compared to a desired size may be considered as weak signals. For example, the image processing results in an image having detected patterns 320, such image may be alternatively referred as detected pattern image 320.

In an embodiment, the features of desired sized may be determined by an image processing operation such as a blob-detection operation, in which the initial mask image 310 is convolved with a kernel with a characteristic modulation distance (a). The result of the convolution is referred as termed the "blob"-image 320 or a detected pattern image 320. An example of blob-detection operation is illustrated in FIG. 4.

Figure 4A:
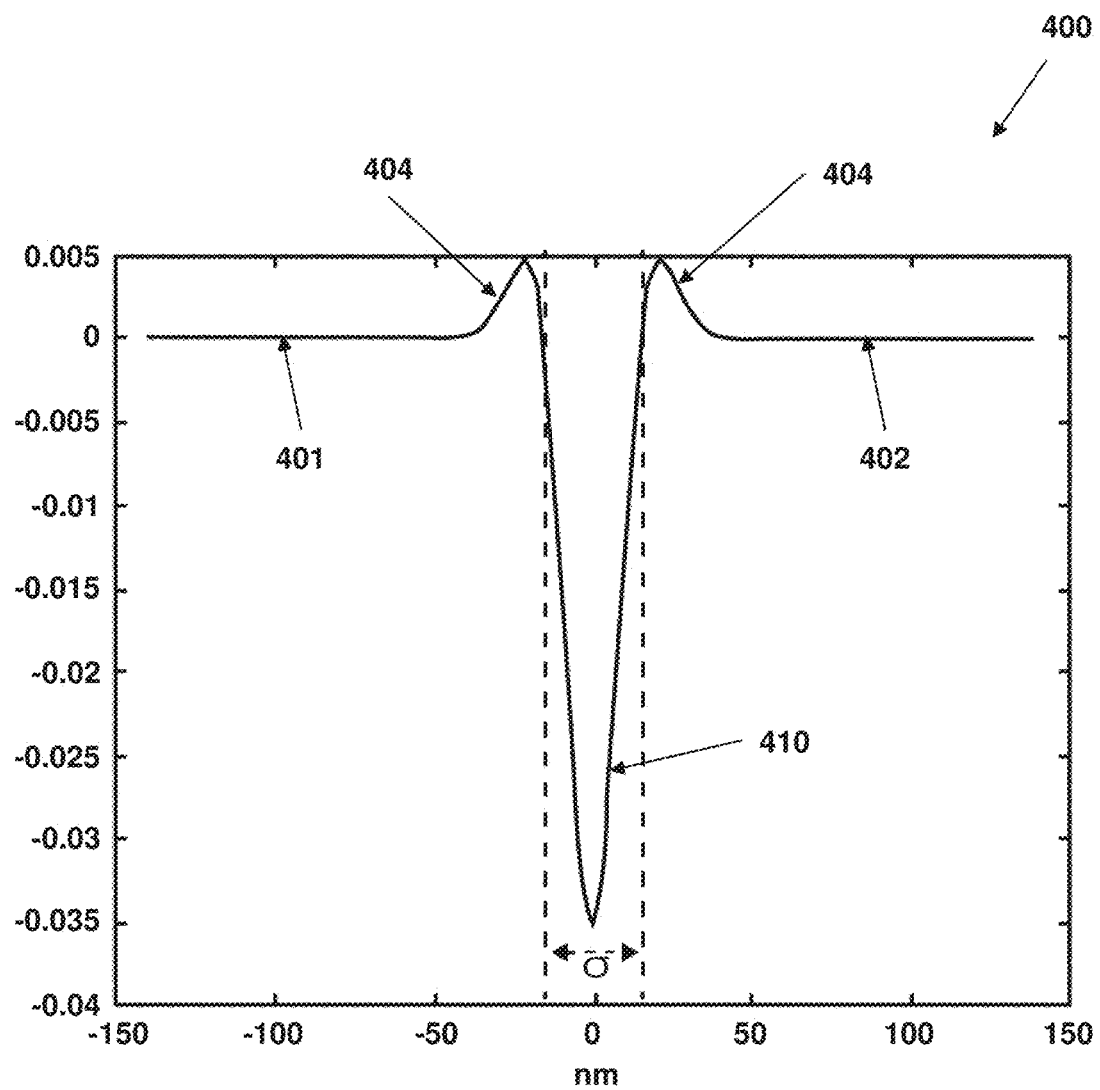
FIG. 4A illustrates an example of a signal used for blob-detection operation according to an embodiment.

Referring to FIG. 4A, within an initial mask image (e.g., 310 in FIG. 3), pixels with approximately zero values (e.g., 401, 402, 403, and 404) are regions relatively far from an image feature (e.g., far from a center of features 312 and 314), and pixels with relatively high non-zero values (e.g., 410) are within a region at or around a feature with a length-scale near a modulation distance (a). For example, regions corresponding to weak signals 401, 402, 403, and 404 (having relatively low amplitude or intensity values) may be far away region indicating absence of a feature of a desired size, while a strong signal 410 may indicate presence of a feature of desired size, which is characterized with the modulation distance (σ).

As an example, the kernel may be a spherically-symmetric Laplacian-of-Gaussians (LoG) or Difference-of-Gaussians (DoG). In an embodiment, the operation with the DoG kernel is fast and results can be plotted as a function of radius (r). In an embodiment, the blob-detection operation is presented as an example to explain the concept of detecting features of a desired size; however, the present disclosure is not limited to the aforementioned kernels. Any kernel configured to detect a feature of desired size, for example, via convolution with an input image may be considered within the scope of the present disclosure.

Figure 4B:
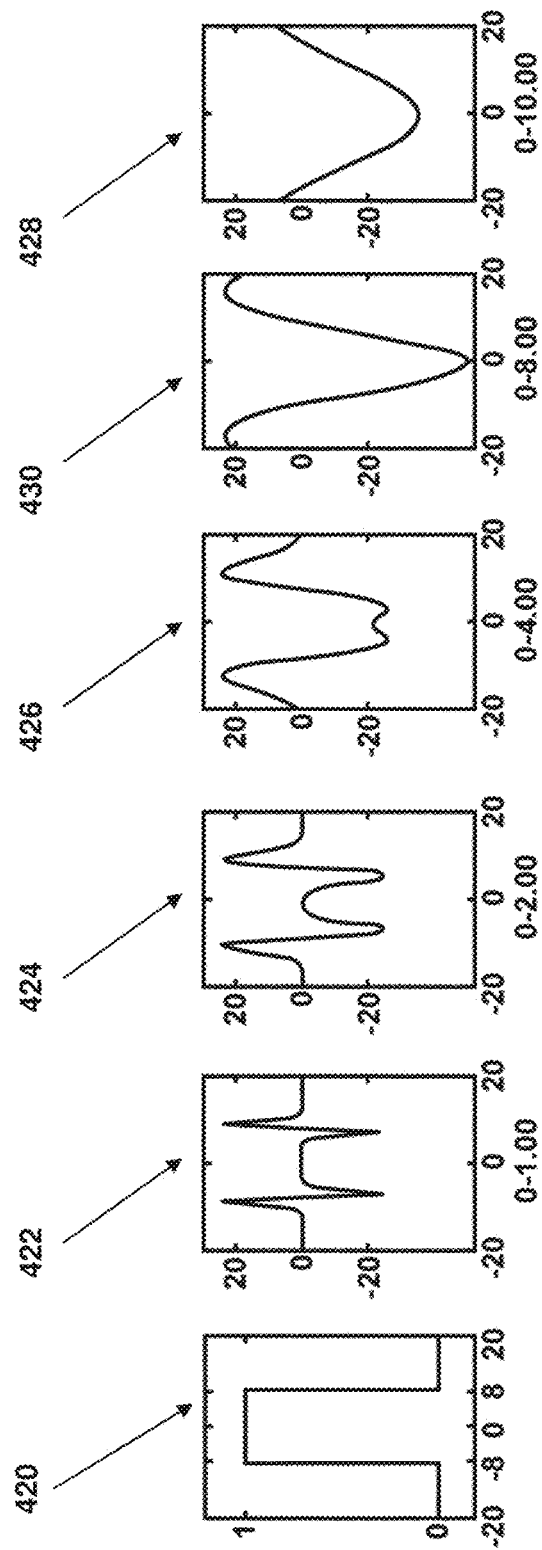
FIG. 4B illustrates an example result of performing blob-operation using a Laplacian-of-Gaussians (LoG) kernel is illustrated according to an embodiment.

In yet another example, blob-operation using a LoG kernel is illustrated in FIG. 4B. In an embodiment, an original signal 420 (e.g., about a desired size of feature to be detected) is obtained. For example, the original signal 420 having a width corresponding to a feature size of 8 nm. Then, the signal 420 is applied via the LoG kernel on an input image to generate response signals such as 422, 424, 426, 428 and 430. Among these responses, the signal of the response 430 is strongest having a maximum amplitude relative to other signal in responses 422, 424, 426, 428 have smaller amplitudes. In an embodiment, the strongest signal is obtained at the original signal (e.g., 8 nm) of the desired feature size.

Referring back to FIG. 3, when a feature detection operation is performed on the initial mask image 310, the resulting image 320 identifies features having sizes around the desired feature size. In detected pattern image 320, features 314 or portions of the features 314 are identified using the image process operation (e.g., blob-operation) that have strong signals. Thus, the features 314 or portions thereof are relatively close to the desired feature size (e.g., an MRC limitation). For example, if a desired feature size is 5 nm, then features or portions thereof with sizes 4 nm-6 nm may be identified. In the detected pattern image 320, although features 314 are identified, their intensity values per pixel may vary. For example, pixels corresponding to the characteristic modulation distance or the desired feature size may have a stronger signal or relatively higher intensity values compared to other pixels within the detected pattern image 320. Thus, in an embodiment, a thresholding based operation may be performed to further isolate the features or portions thereof. For example, in an embodiment, a binarization function with threshold values may be performed on the detected pattern image 320 to further isolate features or portions thereof having strong signal.

In an embodiment, binarization of the detected pattern image 320 results in a binarized pattern image 330 also referred as a binary image 330. In an embodiment, the threshold values for binarization are set such that the binarization function classifies features whose size fall in a given interval of the desired feature size as one and features whose size fall outside a given interval as zero. In an embodiment, the binarization function may be at least one of the sigmoid function, the arctan function, and the step function. According to an embodiment, parameters of the binarization function comprise a steepness and a threshold values.

In an embodiment, the binarization function may be configured to gradually transform the detected image 320 to a binary image. In an embodiment, the binarization function may be a logistic function of the form of:

$$f(\emptyset) = \frac{L}{1 + e^{-k(\emptyset - \emptyset_0)}} \quad (1)$$

In the above equation, L is a curve's maximum value, k is a steepness of the curve and $\emptyset_0$ is a value of variable $\emptyset$ at the curve's midpoint. In an embodiment, variable $\emptyset$ may be a representation of the detected pattern 320, pixel locations in an image. As mentioned earlier, the logistic function may be a sigmoid function (i.e., where k=1, $\emptyset_0$=0, and L=1), an arctan (i.e., inverse tangent) function, and/or a step function in a form, as follows (equation 2):

$$f(\emptyset) = \begin{cases} \text{high, for } \emptyset > \emptyset_0 \\ \text{low, for } \emptyset < \emptyset_0 \end{cases} \quad (2)$$

In an embodiment, to enable the binarization a threshold value may be assigned to the result of a logistic function (e.g., sigmoid) based transformation. For example, in the case of a sigmoid function having maximum and minimum values "1" and "0", respectively, the threshold can be approximately 0.5 (or lower than 0.5), which indicates that after sigmoid transformation a pixel of the resulting image having a value approximately greater than 0.5 may be assigned a value 1, and if lower than 0.5 may be assigned a value 0. In an embodiment, where a step function is used, the binary "1" may be assigned to pixels with values greater than the threshold and the binary "0" may be assigned to pixels with values smaller than the threshold.

In an embodiment, the blob-image (e.g., 320) undergoes a sigmoid transformation to map pixel values below a threshold toward zero and above a threshold toward one. The nonlinear mapping is not limited to the sigmoid function, but any function that is differentiable with respect to the image pixels may be applied. In this binarized image, pixels near one classify the pixel location as belonging to a feature within an interval of particular feature sizes. For example, pixel location belonging to a feature within an interval of a desired feature size.

Further, the detected pattern 320 and the binarized pattern 330 are combined to form a combined image 340, which determines how the feature sizes should be modified. In an embodiment, the defect pattern 320 and the binarized pattern 330 may be combined by multiplying the images 320 and 330. In an embodiment, the images may be represented in a vector form (or other image representation forms), in which case, vectors corresponding to 320 and 330 may be multiplied. The resulting combined image thereby identifies features having sizes within an interval of the desired feature size.

In an embodiment, the combined image includes strong signals corresponding to the desired feature size (e.g., a), as discussed earlier. For example, the strong signal (e.g., 410 in FIG. 4) of the blob-image (e.g., 320 of FIG. 3) when multiplied by binarized image (e.g., 330) may be converted to a value 1 while weak signals may be converted to value 0, thus only features of sizes around the desired feature size are obtained. Further, the combined image is related to a cost function that includes the penalty value.

In an embodiment, the blob-image (e.g., 320) is multiplied by the binarized-image (e.g., 330) to determine a cost function 335 as a function of a size of the feature. The function 335 guides how to modify sizes of the initial mask pattern 310 to reduce the function. In an embodiment, the features sizes are modified to minimize the cost function.

In an embodiment, the cost function may be combination of measure associated with a printed feature of the substrate (e.g., EPE) and a penalty value which is associated with a mask's feature size. The penalty value is also referred to as a MRC regularization cost. In an embodiment, the penalty value may be a scalar value associated with each pixel. For example, a pixel corresponding to a feature of desired feature size may have a relatively higher penalty value associated with it compared to a pixel corresponding to a feature size greater than smaller than the desired feature size. Thus, in an embodiment, when a feature size is modified (e.g. increased or decreased) the penalty value may increase or decrease. In an embodiment, the feature size may be modified by increasing or decreasing intensity values of the pixels of the initial mask image 310.

In an embodiment, application of cost is to non-zero for pixels belonging to a feature within some interval of feature sizes. The largest pixel values occur for patterns with a desired size $S_{th}$. Features smaller or larger than the desired size $S_{th}$ have lower pixel values, so the desired feature size serves as a turning point, about which a size of at least one feature of the initial mask pattern is modified such that the cost function is reduced. In an embodiment, the cost-function will be reduced if features below desired size $S_{th}$ shrink, or above the desired size $S_{th}$ grow. If we define the Critical Dimension (CD) as a measure of the size of the pattern on the mask, then a desired feature size $CD_{th}$ serves as the turning point.

In FIG. 3, an example penalty-based cost function 335 is determined based on the combined image, where the function 335 provides a cost value (e.g., a sum of EPE and penalty value) as a function of feature size. In an embodiment, the function 335 indicates that the penalty value associated with the desired feature size is maximum, while the penalty values may decrease when a feature size increase or decreases. As an example, consider that the desired feature size is 8 nm and the combined image (e.g., multiplication of 320 and 330) includes features of sizes 4 nm and 10 nm. Then, according to the function 335, the features of 4 nm size should be shrunk, e.g., to 2 nm, 1 nm, or 0 nm size to reduce the penalty value. On the other hand, features of 10 nm size should be grown, e.g., to 11 nm, 12 nm, etc. to reduce the penalty value. In an embodiment, the function 335 represents an overall cost, e.g., the sum of EPE value and penalty value, thus, modification of feature sizes is such as to reduce the overall cost.

In an embodiment, the overall cost may be considered, since increasing or decreasing the feature sizes (e.g., SRAF/SERIF features of an optimized OPC) may have undesirable effects (e.g., defects, large deviations from a design pattern) on the patterns printed on the wafer. Thus, in some embodiment, changing features sizes should be such that the overall cost is not increased substantially, and preferably reduced to maintained similar to cost associated with an already optimized initial mask pattern 310.

In an embodiment, the cost function 335 may be obtained via lithographic simulation of the modified mask pattern having feature sizes around the desired feature size. For example, in an iteration, the modified mask pattern may be provided as an input to a patterning process model to predict a pattern that may be printed on the substrate. Then, a difference may be computed between the predicted pattern and the desired pattern, to determine, for example, EPE value. Upon several iterations based on modified sizes of the feature of the mask pattern, a function 335 may be developed.

In an embodiment, the determination of a final mask pattern (e.g., 340) is an optimization process where the cost function including the penalty value is iteratively reduced or minimized. For example, a gradient-based approach may be used where the cost function is differentiated with respect to a mask variable (e.g., pixel intensity) to generate a gradient map. The gradient map guides how, e.g., the pixel intensities and consequently the feature sizes should be modified to reduce the cost function. For example, the gradient map can guide a computing process to a minimum cost value.

As discussed above, the process does not involve actually measuring the sizes of the curvilinear feature, which is challenging. Thus, in an embodiment, measurements of the feature using typical metrology tool may not be necessary to determine modifications to the features so that MRC constraints are satisfied. This is particularly advantageous since measuring sizes of curvilinear patterns is complex and inaccurate.

After one or more iterations of modifying the feature sizes, according to the penalty value or function 335, a final mask pattern 350 may be obtained. For example, in the combined image 340, a cost image is overlaid on the initial mask pattern 310, to highlight regions or pixels of the initial mask pattern which are penalized due to MRC regularization. Thus, to obtain a final mask pattern 350, for example, the features 344 may be modified at certain locations (e.g., highlighted regions) corresponding to locations of the extracted features 334. For example, some of the feature sizes of features 344 may be increased beyond the threshold value while some features sizes may be decreased.

FIG. 5A-5C is an example illustrating a difference between applying modifications to the mask pattern based on penalty values related to a MRC constraint and an initial pattern determined without the MRC related constraint. FIG. 5A illustrates an initial mask pattern 510 having OPC such as SRAFs 516 determined (e.g., via a CTM optimization process) around a main feature 515 (e.g., a contact hole 515). The SRAFs 516 include several portions 517 (including similar marking in other location) where the feature size is in a range 4-8 nm which may not be desired due to mask manufacturing constraint. During mask manufacturing, the initial mask pattern 510 data may be provided to a mask writer which not print some the feature sizes or the initial mask features may be modified randomly to enable mask manufacturing since it will affect the printing performance of the lithographic apparatus.

When the MRC based approach as illustrated in FIG. 3 is applied, a final mask pattern 520 is obtained, as shown in FIG. 5B. The mask pattern 520 is similar to the initial mask pattern 510. For example, the mask pattern 520 also includes the main feature 525 (similar to 515) and SRAFs 526 surrounding the main feature 525. However, the SRAFs 525 have different feature sizes compared to SRAFs 517 of the initial mask 510. According to an embodiment, the feature sizes of the initial mask 517 are modified at several portions (e.g., at locations marked in 510). In an embodiment, the feature sizes may be increase, while in some cases feature sizes may be reduced, in some cases, the feature size may be zero.

FIG. 5C illustrate a comparison 530 between the initial mask pattern 510 without MRC and a modified mask pattern 520 based on MRC. In FIG. 5C, a portion at same location on mask patterns 510 and 520 is magnified. The magnified version of the portion of the mask patterns 510 and 520 is overlapped for comparison purposes. In image 530, a portion 511 (e.g., a portion of SRAF) is part of the initial pattern 510, and portions 521 and 522 are part of the mask pattern 520. It can be seen that the portion 511 has a neck region 513 having a relatively small dimension (e.g., less than 1 nm). During the process of determining the mask pattern 520, the neck region 513 is modified to decrease the size to zero. Consequently, the portion 511 is divided into two separate features 521 and 522 with a spacing 523 (e.g., greater than 10 nm) therebetween. In an embodiment, such spacing may also be part of the MRC constraint. If a space between two features is too small, then it may not be manufactured as well. For example, a penalty value may be associated with the spacing 523 and based on the penalty value, the spacing may be increased to lower the overall cost or the penalty value alone. Thus, the modified portion including features 521 and 522 are generated based on the penalty values as discussed with respect to FIG. 3.

Figure 6C:
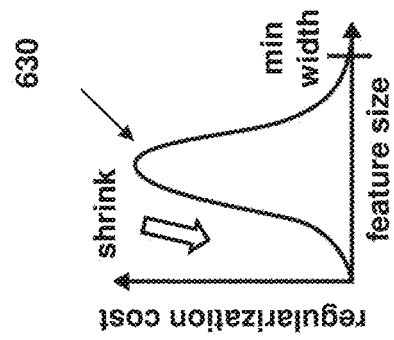
FIG. 6C illustrates an example penalty function applied to shrink a feature of the mask pattern based on MRC according to an embodiment.
Figure 6A:
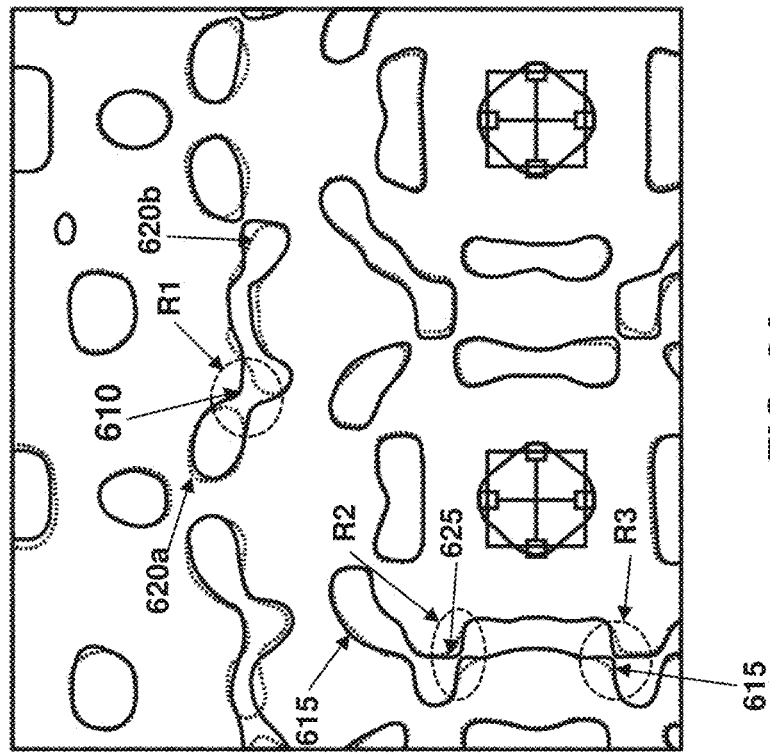
FIG. 6A illustrates an example comparison between a mask pattern obtained based on MRC and another mask pattern obtained without MRC according to an embodiment.
Figure 6B:
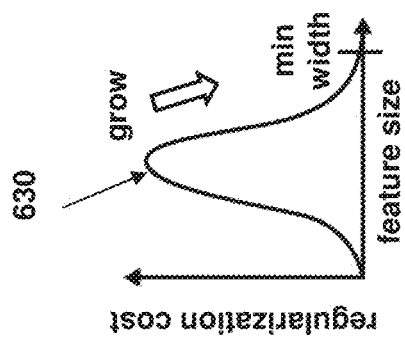
FIG. 6B illustrates an example penalty function applied to grow a feature of the mask pattern based on MRC according to an embodiment.

FIG. 6A shows yet another example comparing results of a mask pattern obtained with MRC based modification of present disclosure and an initial mask pattern (e.g., having no MRC related modification). In an embodiment, one or more features of an initial mask pattern may be modified to satisfy the MRC constraints. In an embodiment, a size of the feature or a spacing between features of a pattern may be modified. For example, a features 610 and 615 of the initial mask pattern is modified. In an embodiment, the feature 610 includes a neck region R1, as shown. According to the present disclosure, a penalty function 630 of FIG. 6C is determined and further based on a penalty value corresponding to a size of the feature 610 in the neck region R1, the mask pattern is transformed into features 620a and 620b with a certain spacing therebetween. In an embodiment, the function 630 indicates that when the size of the feature 610 in the neck region R1 is shrunk/reduced, the penalty value will decrease. As such, the size is reduced to zero and the feature 610 is split in two features 620a and 620b. In an another example, the feature 615 also includes two neck regions R2 and R3 having feature sizes smaller than a desired feature size. According to the function 630 (in FIG. 6B), it is determined that the size of features within the neck regions R2 and R3 should be increased beyond a desired size of the feature as the penalty value is reduced. Thus, the modified mask pattern includes feature 625 having increased feature sizes in the neck region. As shown, feature having different shapes, but similar sizes may be modified differently. For example, the neck regions R1, R2, R3 have similar low values. However, based on the penalty value (or the overall cost value) applied to the respective features 610 and 615 two different outcomes 620a and 620b, and 625, respectively, are obtained. Thus, according to an embodiment, when the methods of determining mask pattern according to the present disclosure are integrated in the CTM process, results obtained may vary based on the penalty values or the overall cost function. In an embodiment, such results may be non-intuitive, for example, as discussed similar sized features (e.g., in R1, R2, R3) were modified differently.

Figure 7A:
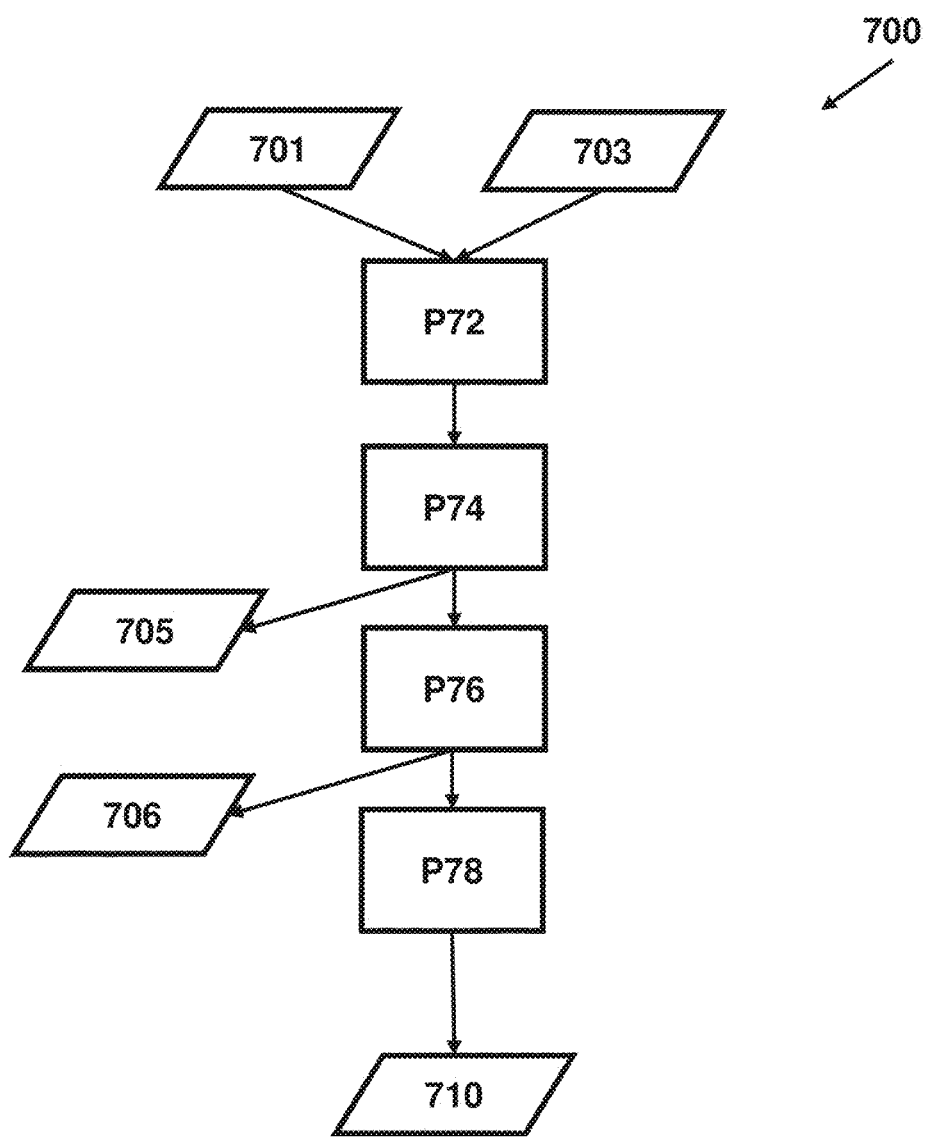
FIG. 7A is a flow chart of a method for determining a mask pattern according to an embodiment.

FIG. 7A is a flow chart of a method 700 for determining a mask pattern. In the method 700 a patterning device pattern is determined based on the manufacturing limitations of a mask manufacturing tool (e.g., e-beam tool). In an embodiment, the manufacturing limitation is defined in terms of a desired size or a minimum size of a feature of a mask pattern that can be manufactured via the mask manufacturing tool. Accordingly, based on the manufacturing limitations (e.g., a minimum feature size), an initial mask pattern (e.g., a CTM based curvilinear mask pattern) is modified to accommodate the manufacturing limitation. An example of the initial mask pattern (e.g., 310) and its modification to obtain a final mask pattern (e.g., 340) is discussed with respect to FIG. 3. The example is used herein for explaining the method 700. As mentioned earlier, such modification of the initial mask pattern may cause a printed pattern on a substrate to deviate from a target pattern (e.g., a desired pattern). Such deviation from target pattern may be measured in terms of a cost function such as an edge placement error, CD, an area of a feature, or other relevant metric related to a printed feature on a substrate. In an embodiment, the cost function along with the penalty value (e.g., 335 in FIG. 3) of the present disclosure is used to determine the modified mask pattern. The steps or process involved in the method 700 are further discussed in detail below.

The method, in process P72, involves obtaining (i) an initial mask pattern 701 having at least one feature, and (ii) a desired feature size 703 of the at least one feature. In an embodiment, the initial mask pattern 701 (e.g., 310 of FIG. 3) may be a curvilinear mask pattern or a Manhattan pattern. For example, the curvilinear mask pattern 310 may be obtained using a CTM/CTM+ process as discussed earlier. In an embodiment, the at least one feature of curvilinear patterns in 310 includes one or more OPC related patterns such as an SRAF. In embodiment, the initial mask pattern is a pixelated image, where each pixel has an intensity value. The intensity value corresponds to a signal in the image. For example, the signal indicates the presence of one or more feature of a pattern. So, pixels having relatively higher intensity values than other pixels indicate a strong signal or presence of a feature such as a main feature or OPC related feature e.g., SRAF/SERIF.

The method, in process P74, involves obtaining, via a patterning process model based on the initial mask pattern and a target pattern for the substrate, a difference value between a predicted pattern of a substrate imaged by the initial mask and the target pattern for the substrate. In an embodiment, the predicted pattern may be obtained by simulating the patterning process model (e.g., an optics model, an aerial image model, a resist model, etc.) with the initial mask pattern as input to generate the predicted pattern and comparing the predicted pattern with the target pattern to determine a difference value (e.g., EPE).

Figure 7B:
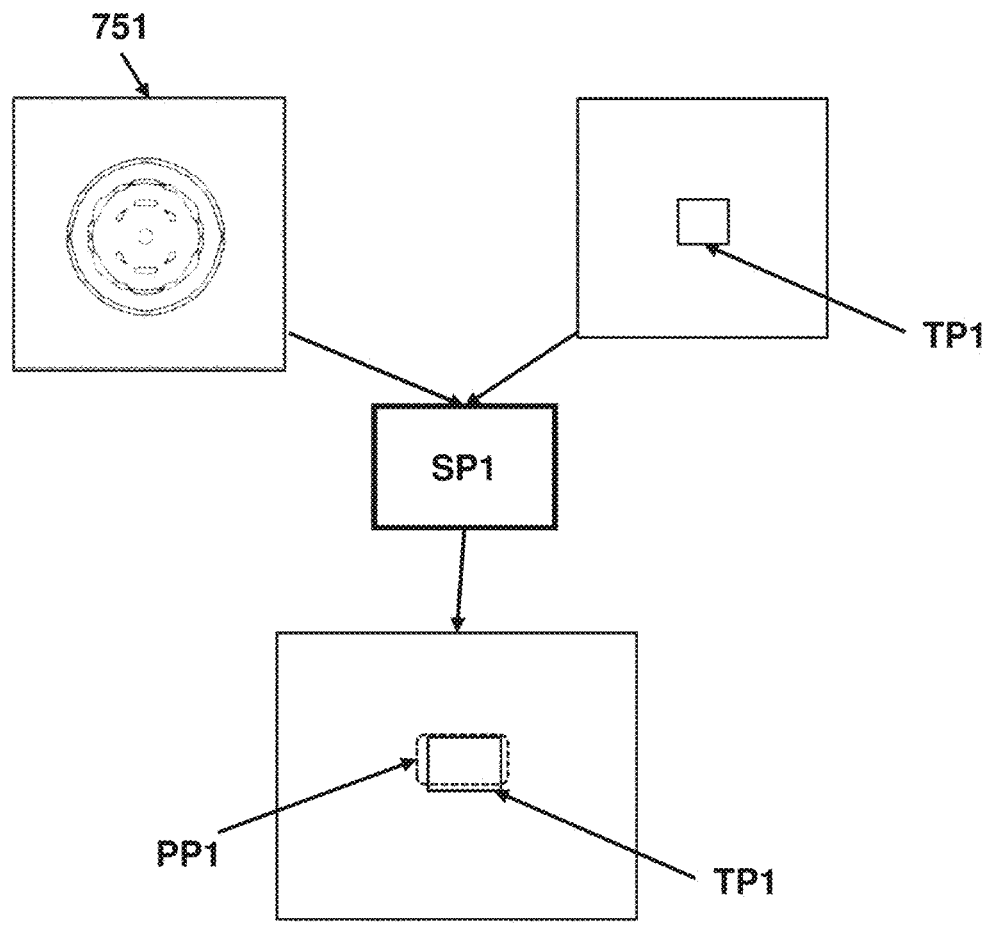
FIG. 7B is an example simulation process for obtaining a predicted pattern for method of FIG. 7A according to an embodiment.

For example, FIG. 7B illustrates an example of determining a predicted pattern PP1 (in dotted) from the initial mask pattern 751 (an example of 701), and a target pattern TP1. The simulation process SP1 involves simulation of patterning process models, e.g., as discussed in FIG. 2. Furthermore, a difference between the predicted pattern PP1 and the target pattern TP1 is determined. In an embodiment, the difference is a difference value is an edge placement error between a contour of a feature of the predicted pattern PP1 and a contour of the target pattern TP1 that corresponds to the contour of the predicted pattern. In an embodiment, the edge placement error is determined by computing a difference value between the contours of PP1 and TP1 at different locations along the contour of the PP1 and TP1, then sum of the difference values may be determined to determine the EPE. In an embodiment, the difference value may be a difference in area of the polygon of PP1 and the polygon of the TP1. In yet another example, the difference value may be a difference in CD (e.g., width or height). The difference is not limited to the above examples and other appropriate metric (e.g., geometry based) may be used to determine a difference value.

Referring back to FIG. 7A, the method, in process P76, involves determining, via a processor (e.g., the processor 104), a penalty value related to a manufacturability of the at least one feature, where the penalty value varies as a function of the size of the at least one feature. In embodiment, the penalty valve may be determined as discussed with respect to FIG. 3.

In an embodiment, the determining the penalty value involves detecting a pattern of the initial mask pattern having features with sizes around the desired feature size. In an embodiment, the detected patterns include features having sizes within a desired range (e.g., ±5%, ±10%, ±20%, ±0.1 nm, ±0.3 nm, ±0.5 nm, ±1 nm, etc.) range of the desired feature size. In an embodiment, other appropriate may be selected based on kernel used and the desired size of a feature. In an embodiment, the pattern of a desired size may be determined by convolving a kernel having characteristic modulation distance of approximately the desired feature size. In an embodiment, the kernel (e.g., LoG or DoG) having a characteristic modulation distance is convolved with the pixelated image of the initial mask pattern, where the characteristic modulation distance corresponds to a range of values around a signal of the pixelated image such as shown in FIG. 4. In an embodiment, the signal is related to an intensity of a pixel of the pixelated image. An example of detecting a pattern is illustrated in FIG. 3 with respect to detected pattern image 320.

Further, the detected pattern is used for computing a binarized pattern of the detected pattern using a binarization function. In an embodiment, the binarization function (e.g., sigmoid) classifies features whose size fall in a given interval of the desired feature size. An example of generating the binarized pattern is discussed with respect to the binarized image 330.

In an embodiment, the computing of the binarized pattern is based on image processing of an image of the detected pattern. Such computing involves identifying pixels within the image of the detected patterns based on a binarization threshold value (e.g., greater than 0.5), where the binarization threshold value classifies a pixel location belonging to a feature within a given interval of the desired size of the at least one feature. For example, the classified location may be assigned "1" if the intensity of the pixel is 0.8, which indicates that the pixel corresponds to a feature whose size is relatively close to the desired feature size.

Further, based on a combination of the detected pattern and the binarized pattern, determining the penalty value. The combination of the detected pattern and the binarized pattern includes features of varying sizes, which is associated with a penalty value thereby providing a basis for determining a penalty associated with changing a size of the feature.

In an embodiment, the determining of the penalty value is further discussed with respect to FIGS. 8A-8E. FIG. 8A is an example process of generating a penalty function (or a cost function therefrom) that is used to determine modifications (e.g., increase or decrease a size of a feature) to the initial mask pattern. In an embodiment, initial mask image 801 (e.g., a curvilinear mask image) is obtained (e.g., using CTM process). In an embodiment, the initial mask image may be converted in to a vector form 803. In an embodiment, the conversion to vector form 803 involves applying sigmoid transformation (e.g., with threshold of greater than 0.6, where the threshold value varies between 0 and 1).

Further, the initial mask image 801 (or 803) is convoluted with a kernel 805 (e.g., LoG or DoG), as discussed earlier, to generate a blob image 810. As mentioned earlier, the kernel 805 includes a parameter such as characteristic modulation distance, which can be set as, e.g., a CD threshold value ($CD_{th}$) that relates to a MRC.

Upon convolution, the resulting blog image 810 has an intensity profile 830 centered around the $CD_{th}$, as shown in FIG. 8B. The intensity profile 830 indicates that features having CD values close to the $CD_{th}$ have relatively high intensity, and as CD values decrease or increase with respect to the $CD_{th}$, the intensity values decreases as shown. In an embodiment, the intensity profile 830 is a bell shaped curve, where the intensity values decrease exponentially as CD values increase or decrease with respect to the $CD_{th}$.

Further, the blob image 810 is converted to a binary image 815 by applying a binarization function such as a step or a sigmoid function, as discussed earlier, to convert the intensity profile 830 to a binary intensity profile 816. For example, a step function 812 in FIG. 8C may be applied to the intensity profile 830 of the blob image 810. In an embodiment, the step function 812 includes a binarization threshold value Bt. In an embodiment, the binarization threshold value $B_{th}$ value is selected such that only certain intensity values of the intensity profile 830 (e.g., within an interval range around the $CD_{th}$) will be converted to 1 and remaining intensity values of the intensity profile 830 (e.g., further away from $CD_{th}$) will be 0. The resulting binarized image intensity profile i.e., the binarized intensity profile 816 is shown in FIG. 8D. In other words, a window of feature sizes is identified that has intensity values greater than or equal to the binarization threshold. This binarized intensity 816 is multiplied with the blob image intensity profile 830 to generate a penalty value function 822, where an image intensity varies as a function of the CD values within a range identified in the binarized intensity 816. The function 822 is further used to modify feature sizes of the initial mask image 801. For example, modify feature sizes that fall within the CD range of the penalty value function 822, so that the penalty value is reduced or minimized (e.g., 0).

Referring back to FIG. 7A, the method 700, in process P78, determining the mask pattern based on the initial mask pattern and the desired feature size such that a sum of the difference value and the penalty value is reduced. Examples illustrating how to modify the feature size based on the penalty value (e.g., functions 335 in FIGS. 3 and 630 in FIGS. 6B and 6C) were discussed earlier in the disclosure. In an embodiment, the determining of the mask pattern is an iterative process. An iteration includes modifying the size of the at least one feature of the initial mask pattern, determining the penalty value corresponding to the modified size of the at least one feature, and determining whether the sum of the difference value (e.g., EPE) and the penalty value is reduced. In an embodiment, the modifying the size of the at least one feature of the initial mask pattern involves increasing or decreasing the size of the at least one feature so that the sum of the difference value and the penalty value is reduced.

In an embodiment, the increasing the size of the at least one feature causes the sum of the difference value and the penalty value to be minimized. For example, increasing sizes of necks in R2 and R3 of FIG. 6A based on a penalty value from function 630 in FIG. 6B, as discussed earlier.

In an embodiment, the decreasing the size of the at least one feature causes the sum of the difference value and the penalty value to be minimized. In an embodiment, the decreasing the size of the at least one feature eliminates the at least one feature from the mask pattern. For example, increasing the size of neck in R1 of FIG. 6A based on a penalty value from function 630 in FIG. 6C, as discussed earlier.

As mentioned earlier, the penalty value is a scalar value associated with a pixel of the pixelated mask pattern, where the pixel corresponds to the at least one feature being modified.

Furthermore, the method 700 may be configured to such that modifying the mask pattern comprises optical proximity corrections comprising a placement of assist features and/or contour modification. For example, by integrating the penalty value or penalty function and modifying the mask via a mask optimization process, or source-mask optimization process, which may automatically produce different OPC pattern than existing process. Thus, the present method not only improves the mask manufacturing process but also the yield of the lithographic process.

According to an embodiment, the method 700 employs image based mask optimization, where the initial mask pattern and the mask pattern is a pixelated image. During the mask modification process, the cost function is optimized based on the pixel values of the mask pattern image, as discussed earlier.

Figure 9B:
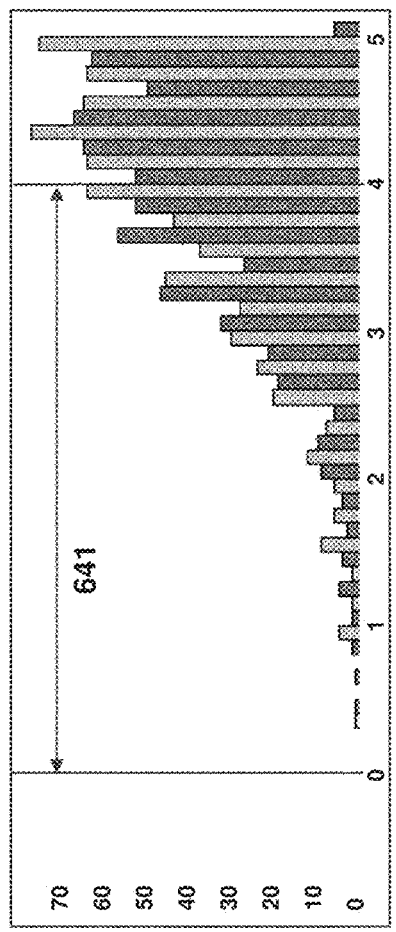
FIG. 9B is an example of defects observed on a substrate imaged using a mask generated based on conventional methods.
Figure 9C:
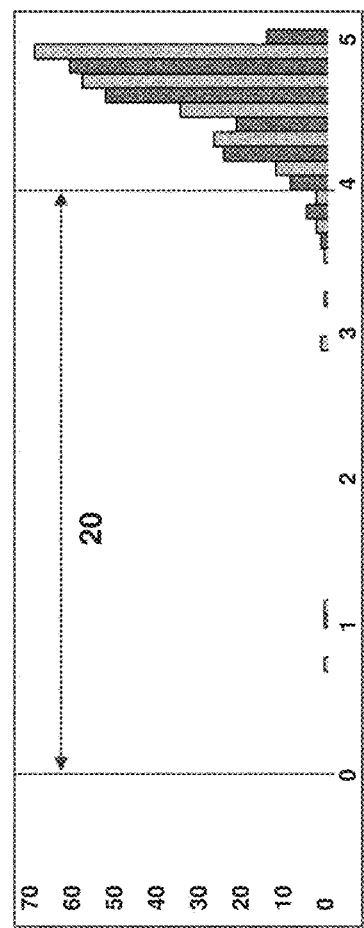
FIG. 9C is an example of defects observed on a substrate imaged using a mask generated based on method of FIG. 7A.
Figure 9A:
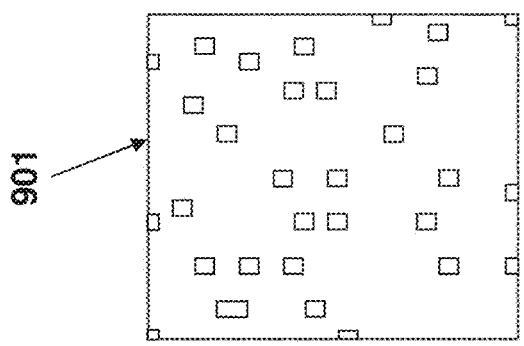
FIG. 9A illustrates an example target pattern according to an embodiment.

FIGS. 9A-9B are results illustrating difference between defects observed for a mask pattern developed by conventional methods (e.g., in which MRC is not considered) and the present method. FIG. 9A illustrates an example target pattern 901 comprising contact holes. A mask pattern developed corresponding to the target pattern 901 based on the conventional methods produces a higher number of defects on a wafer compared to the mask pattern developed according to the present disclosure. In the present example, when a printed wafer pattern (or simulated wafer pattern) includes contact-hole to contact-hole distance having less than or equal 4 nm, the wafer is said to have a defect. For example, referring to a histogram of FIG. 9B, several defects are observed on a wafer developed based on a first mask pattern (e.g., developed based on the conventional methods). For example, defects are observed for c2c widths, e.g., less than 4 nm. On the other hand, referring to FIG. 9C, substantially lower number of defects are observed (compared to FIG. 9B) when a mask pattern developed based on methods of present disclosure is used.

Figure 10:
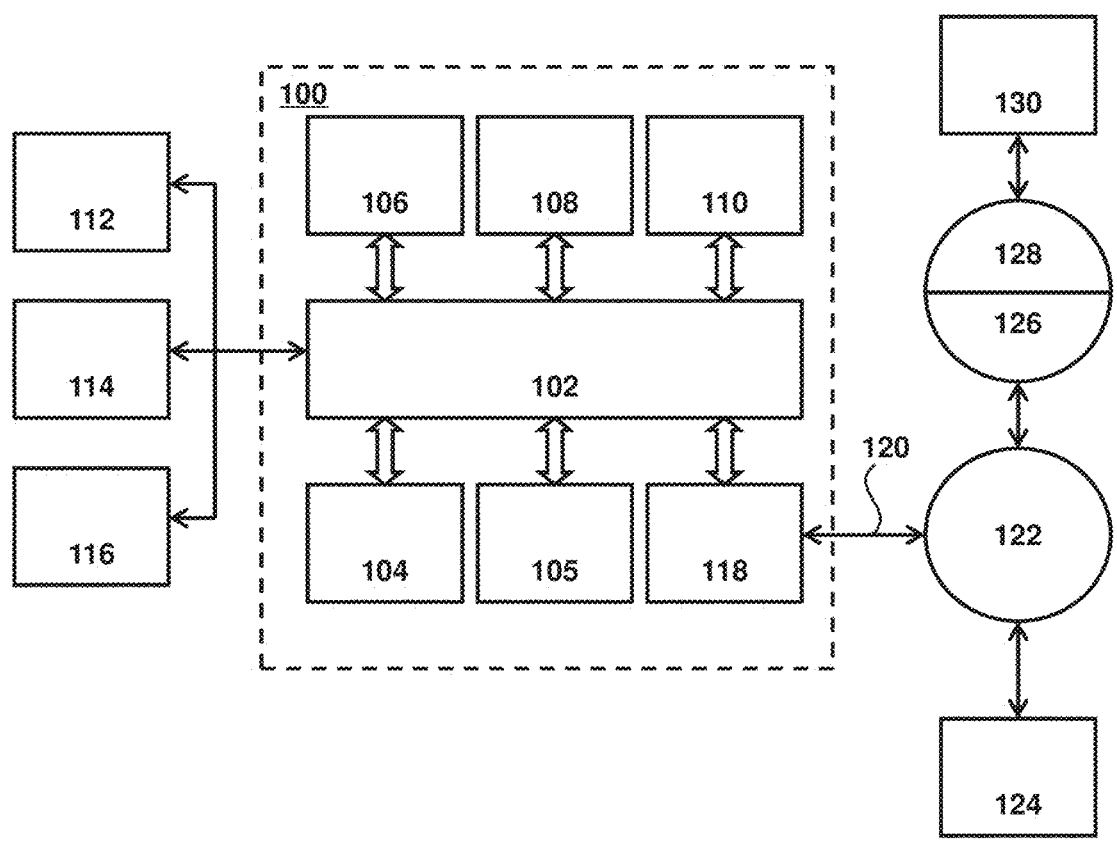
FIG. 10 is a block diagram of an example computer system, according to an embodiment.

FIG. 10 is a block diagram that illustrates a computer system 100 which can assist in implementing the methods, flows or the apparatus disclosed herein. Computer system 100 includes a bus 102 or other communication mechanism for communicating information, and a processor 104 (or multiple processors 104 and 105) coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or flat panel or touch panel display for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. A touch panel (screen) display may also be used as an input device.

According to one embodiment, portions of one or more methods described herein may be performed by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In an alternative embodiment, hard-wired circuitry may be used in place of or in combination with software instructions. Thus, the description herein is not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 may also include a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. One such downloaded application may provide all or part of a method described herein, for example. The received code may be executed by processor 104 as it is received, and/or stored in storage device 110, or other non-volatile storage for later execution. In this manner, computer system 100 may obtain application code in the form of a carrier wave.

Figure 11:
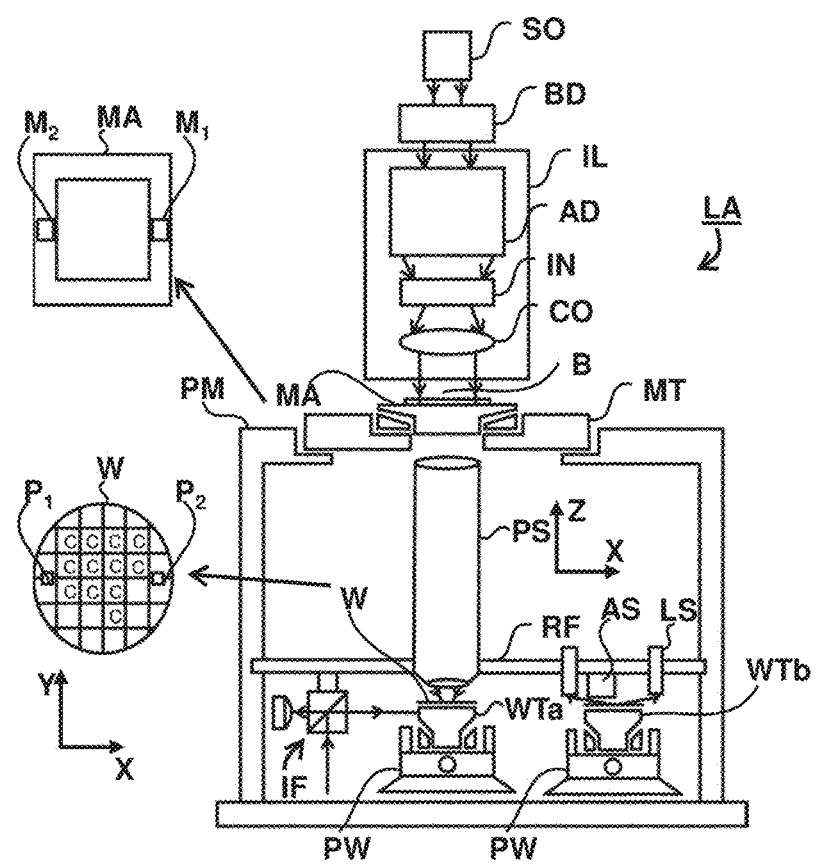
FIG. 11 is a schematic diagram of a lithographic projection apparatus, according to an embodiment.

FIG. 11 schematically depicts an exemplary lithographic projection apparatus in conjunction with the techniques described herein that can be utilized. The apparatus comprises:

- an illumination system IL, to condition a beam B of radiation. In this particular case, the illumination system also comprises a radiation source SO;
- a first object table (e.g., patterning device table) MT provided with a patterning device holder to hold a patterning device MA (e.g., a reticle), and connected to a first positioner to accurately position the patterning device with respect to item PS;
- a second object table (substrate table) WT provided with a substrate holder to hold a substrate W (e.g., a resist-coated silicon wafer), and connected to a second positioner to accurately position the substrate with respect to item PS;
- a projection system ("lens") PS (e.g., a refractive, catoptric or catadioptric optical system) to image an irradiated portion of the patterning device MA onto a target portion C (e.g., comprising one or more dies) of the substrate W.

As depicted herein, the apparatus is of a transmissive type (i.e., has a transmissive patterning device). However, in general, it may also be of a reflective type, for example (with a reflective patterning device). The apparatus may employ a different kind of patterning device to classic mask; examples include a programmable mirror array or LCD matrix.

The source SO (e.g., a mercury lamp or excimer laser, LPP (laser produced plasma) EUV source) produces a beam of radiation. This beam is fed into an illumination system (illuminator) IL, either directly or after having traversed conditioning means, such as a beam expander Ex, for example. The illuminator IL may comprise adjusting means AD for setting the outer and/or inner radial extent (commonly referred to as σ-outer and σ-inner, respectively) of the intensity distribution in the beam. In addition, it will generally comprise various other components, such as an integrator IN and a condenser CO. In this way, the beam B impinging on the patterning device MA has a desired uniformity and intensity distribution in its cross-section.

It should be noted with regard to FIG. 11 that the source SO may be within the housing of the lithographic projection apparatus (as is often the case when the source SO is a mercury lamp, for example), but that it may also be remote from the lithographic projection apparatus, the radiation beam that it produces being led into the apparatus (e.g., with the aid of suitable directing mirrors); this latter scenario is often the case when the source SO is an excimer laser (e.g., based on KrF, ArF or $F_2$ lasing).

The beam PB subsequently intercepts the patterning device MA, which is held on a patterning device table MT. Having traversed the patterning device MA, the beam B passes through the lens PL, which focuses the beam B onto a target portion C of the substrate W. With the aid of the second positioning means (and interferometric measuring means IF), the substrate table WT can be moved accurately, e.g. so as to position different target portions C in the path of the beam PB. Similarly, the first positioning means can be used to accurately position the patterning device MA with respect to the path of the beam B, e.g., after mechanical retrieval of the patterning device MA from a patterning device library, or during a scan. In general, movement of the object tables MT, WT will be realized with the aid of a long-stroke module (coarse positioning) and a short-stroke module (fine positioning), which are not explicitly depicted in FIG. 11. However, in the case of a stepper (as opposed to a step-and-scan tool) the patterning device table MT may just be connected to a short stroke actuator, or may be fixed.

The depicted tool can be used in two different modes:

In step mode, the patterning device table MT is kept essentially stationary, and an entire patterning device image is projected in one go (i.e., a single "flash") onto a target portion C. The substrate table WT is then shifted in the x and/or y directions so that a different target portion C can be irradiated by the beam PB;

In scan mode, essentially the same scenario applies, except that a given target portion C is not exposed in a single "flash". Instead, the patterning device table MT is movable in a given direction (the so-called "scan direction", e.g., the y direction) with a speed v, so that the projection beam B is caused to scan over a patterning device image; concurrently, the substrate table WT is simultaneously moved in the same or opposite direction at a speed V=Mv, in which M is the magnification of the lens PL (typically, M=¼ or ⅕). In this manner, a relatively large target portion C can be exposed, without having to compromise on resolution.

Figure 12:
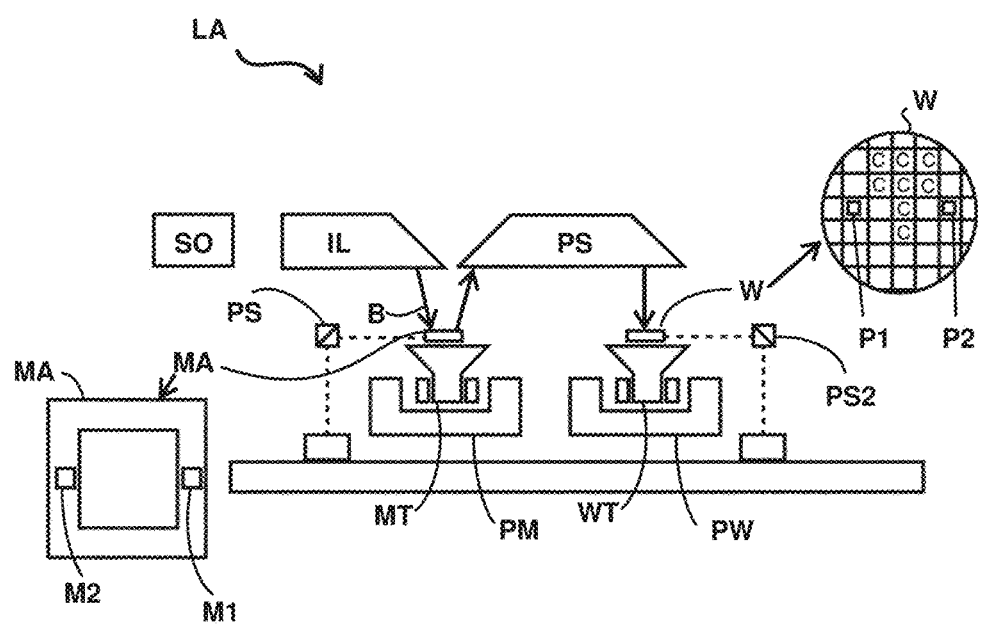
FIG. 12 is a schematic diagram of another lithographic projection apparatus, according to an embodiment.

FIG. 12 schematically depicts another exemplary lithographic projection apparatus 1000 in conjunction with the techniques described herein can be utilized.

The lithographic projection apparatus 1000 comprises:
- a source collector module SO
- an illumination system (illuminator) IL configured to condition a radiation beam B (e.g. EUV radiation).
- a support structure (e.g. a patterning device table) MT constructed to support a patterning device (e.g. a mask or a reticle) MA and connected to a first positioner PM configured to accurately position the patterning device;
- a substrate table (e.g. a wafer table) WT constructed to hold a substrate (e.g. a resist coated wafer) W and connected to a second positioner PW configured to accurately position the substrate; and
- a projection system (e.g. a reflective projection system) PS configured to project a pattern imparted to the radiation beam B by patterning device MA onto a target portion C (e.g. comprising one or more dies) of the substrate W.

As here depicted, the apparatus 1000 is of a reflective type (e.g. employing a reflective patterning device). It is to be noted that because most materials are absorptive within the EUV wavelength range, the patterning device may have multilayer reflectors comprising, for example, a multi-stack of Molybdenum and Silicon. In one example, the multi-stack reflector has a 40 layer pairs of Molybdenum and Silicon where the thickness of each layer is a quarter wavelength. Even smaller wavelengths may be produced with X-ray lithography. Since most material is absorptive at EUV and x-ray wavelengths, a thin piece of patterned absorbing material on the patterning device topography (e.g., a TaN absorber on top of the multi-layer reflector) defines where features would print (positive resist) or not print (negative resist).

Referring to FIG. 12, the illuminator IL receives an extreme ultra violet radiation beam from the source collector module SO. Methods to produce EUV radiation include, but are not necessarily limited to, converting a material into a plasma state that has at least one element, e.g., xenon, lithium or tin, with one or more emission lines in the EUV range. In one such method, often termed laser produced plasma ("LPP") the plasma can be produced by irradiating a fuel, such as a droplet, stream or cluster of material having the line-emitting element, with a laser beam. The source collector module SO may be part of an EUV radiation system including a laser, not shown in FIG. 12, for providing the laser beam exciting the fuel. The resulting plasma emits output radiation, e.g., EUV radiation, which is collected using a radiation collector, disposed in the source collector module. The laser and the source collector module may be separate entities, for example when a CO2 laser is used to provide the laser beam for fuel excitation.

In such cases, the laser is not considered to form part of the lithographic apparatus and the radiation beam is passed from the laser to the source collector module with the aid of a beam delivery system comprising, for example, suitable directing mirrors and/or a beam expander. In other cases the source may be an integral part of the source collector module, for example when the source is a discharge produced plasma EUV generator, often termed as a DPP source.

The illuminator IL may comprise an adjuster for adjusting the angular intensity distribution of the radiation beam. Generally, at least the outer and/or inner radial extent (commonly referred to as σ-outer and σ-inner, respectively) of the intensity distribution in a pupil plane of the illuminator can be adjusted. In addition, the illuminator IL may comprise various other components, such as faceted field and pupil mirror devices. The illuminator may be used to condition the radiation beam, to have a desired uniformity and intensity distribution in its cross section.

The radiation beam B is incident on the patterning device (e.g., mask) MA, which is held on the support structure (e.g., patterning device table) MT, and is patterned by the patterning device. After being reflected from the patterning device (e.g. mask) MA, the radiation beam B passes through the projection system PS, which focuses the beam onto a target portion C of the substrate W. With the aid of the second positioner PW and position sensor PS2 (e.g. an interferometric device, linear encoder or capacitive sensor), the substrate table WT can be moved accurately, e.g. so as to position different target portions C in the path of the radiation beam B. Similarly, the first positioner PM and another position sensor PS1 can be used to accurately position the patterning device (e.g. mask) MA with respect to the path of the radiation beam B. Patterning device (e.g. mask) MA and substrate W may be aligned using patterning device alignment marks M1, M2 and substrate alignment marks P1, P2.

The depicted apparatus 1000 could be used in at least one of the following modes:

1. In step mode, the support structure (e.g. patterning device table) MT and the substrate table WT are kept essentially stationary, while an entire pattern imparted to the radiation beam is projected onto a target portion C at one time (i.e. a single static exposure). The substrate table WT is then shifted in the X and/or Y direction so that a different target portion C can be exposed.

2. In scan mode, the support structure (e.g. patterning device table) MT and the substrate table WT are scanned synchronously while a pattern imparted to the radiation beam is projected onto a target portion C (i.e. a single dynamic exposure). The velocity and direction of the substrate table WT relative to the support structure (e.g. patterning device table) MT may be determined by the (de-)magnification and image reversal characteristics of the projection system PS.

3. In another mode, the support structure (e.g. patterning device table) MT is kept essentially stationary holding a programmable patterning device, and the substrate table WT is moved or scanned while a pattern imparted to the radiation beam is projected onto a target portion C. In this mode, generally a pulsed radiation source is employed and the programmable patterning device is updated as required after each movement of the substrate table WT or in between successive radiation pulses during a scan. This mode of operation can be readily applied to maskless lithography that utilizes programmable patterning device, such as a programmable mirror array of a type as referred to above.

Figure 13:
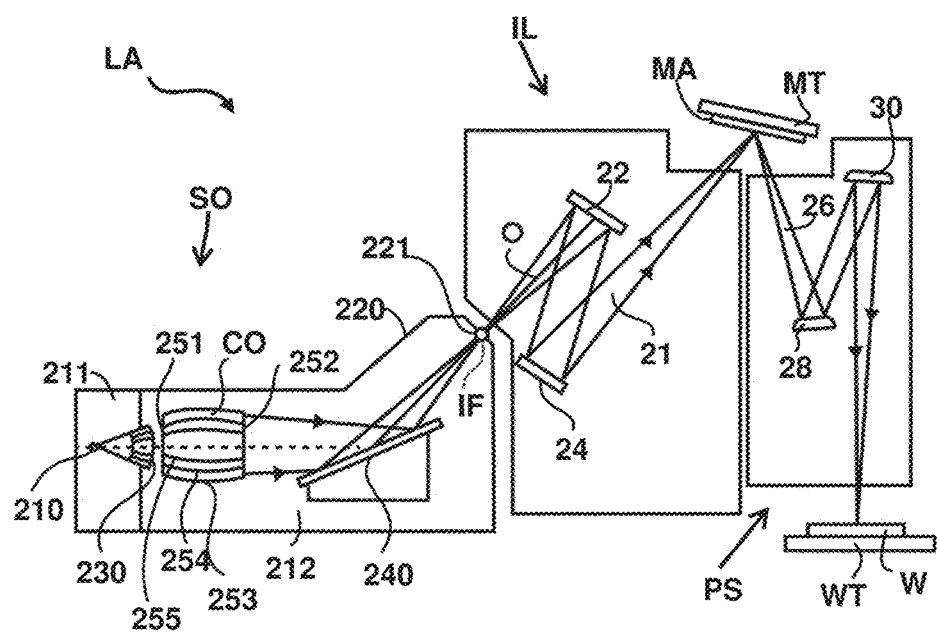
FIG. 13 is a more detailed view of the apparatus in FIG. 11, according to an embodiment.

FIG. 13 shows the apparatus 1000 in more detail, including the source collector module SO, the illumination system IL, and the projection system PS. The source collector module SO is constructed and arranged such that a vacuum environment can be maintained in an enclosing structure 220 of the source collector module SO. An EUV radiation emitting plasma 210 may be formed by a discharge produced plasma source. EUV radiation may be produced by a gas or vapor, for example Xe gas, Li vapor or Sn vapor in which the very hot plasma 210 is created to emit radiation in the EUV range of the electromagnetic spectrum. The very hot plasma 210 is created by, for example, an electrical discharge causing at least partially ionized plasma. Partial pressures of, for example, 10 Pa of Xe, Li, Sn vapor or any other suitable gas or vapor may be required for efficient generation of the radiation. In an embodiment, a plasma of excited tin (Sn) is provided to produce EUV radiation.

The radiation emitted by the hot plasma 210 is passed from a source chamber 211 into a collector chamber 212 via an optional gas barrier or contaminant trap 230 (in some cases also referred to as contaminant barrier or foil trap) which is positioned in or behind an opening in source chamber 211. The contaminant trap 230 may include a channel structure. Contamination trap 230 may also include a gas barrier or a combination of a gas barrier and a channel structure. The contaminant trap or contaminant barrier 230 further indicated herein at least includes a channel structure, as known in the art.

The collector chamber 211 may include a radiation collector CO which may be a so-called grazing incidence collector. Radiation collector CO has an upstream radiation collector side 251 and a downstream radiation collector side 252. Radiation that traverses collector CO can be reflected off a grating spectral filter 240 to be focused in a virtual source point IF along the optical axis indicated by the dot-dashed line 'O'. The virtual source point IF is commonly referred to as the intermediate focus, and the source collector module is arranged such that the intermediate focus IF is located at or near an opening 221 in the enclosing structure 220. The virtual source point IF is an image of the radiation emitting plasma 210.

Subsequently the radiation traverses the illumination system IL, which may include a facetted field mirror device 22 and a facetted pupil mirror device 24 arranged to provide a desired angular distribution of the radiation beam 21, at the patterning device MA, as well as a desired uniformity of radiation intensity at the patterning device MA. Upon reflection of the beam of radiation 21 at the patterning device MA, held by the support structure MT, a patterned beam 26 is formed and the patterned beam 26 is imaged by the projection system PS via reflective elements 28, 30 onto a substrate W held by the substrate table WT.

More elements than shown may generally be present in illumination optics unit IL and projection system PS. The grating spectral filter 240 may optionally be present, depending upon the type of lithographic apparatus. Further, there may be more mirrors present than those shown in the figures, for example there may be 1-6 additional reflective elements present in the projection system PS than shown in FIG. 13.

Collector optic CO, as illustrated in FIG. 13, is depicted as a nested collector with grazing incidence reflectors 253, 254 and 255, just as an example of a collector (or collector mirror). The grazing incidence reflectors 253, 254 and 255 are disposed axially symmetric around the optical axis O and a collector optic CO of this type may be used in combination with a discharge produced plasma source, often called a DPP source.

Figure 14:
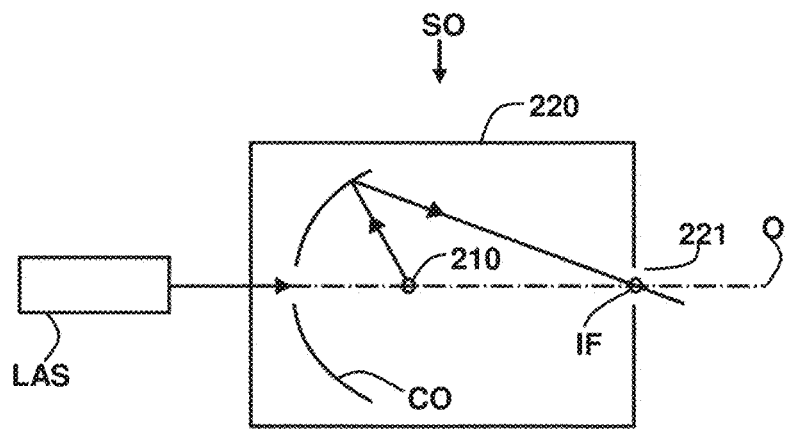
FIG. 14 is a more detailed view of the source collector module SO of the apparatus of FIG. 12 and FIG. 13, according to an embodiment.

Alternatively, the source collector module SO may be part of an LPP radiation system as shown in FIG. 14. A laser LA is arranged to deposit laser energy into a fuel, such as xenon (Xe), tin (Sn) or lithium (Li), creating the highly ionized plasma 210 with electron temperatures of several 10's of eV. The energetic radiation generated during de-excitation and recombination of these ions is emitted from the plasma, collected by a near normal incidence collector optic CO and focused onto the opening 221 in the enclosing structure 220.

The embodiments may further be described using the following clauses:

1. A method for determining a patterning device pattern, the method comprising:
    obtaining (i) an initial patterning device pattern having at least one feature, and (ii) a desired feature size of the at least one feature;
    obtaining, based on a patterning process model, the initial patterning device pattern and a target pattern for a substrate, a difference value between a predicted pattern of the substrate image using the initial patterning device pattern and the target pattern for the substrate;
    determining a penalty value related to the manufacturability of the at least one feature, wherein the penalty value varies as a function of the size of the at least one feature; and
    determining the patterning device pattern based on the initial patterning device pattern and the desired feature size such that a sum of the difference value and the penalty value is reduced.
2. The method of clause 1, wherein the determining the patterning device pattern is an iterative process, an iteration comprises:
    modifying the size of the at least one feature of the initial patterning device pattern;
    determining the penalty value corresponding to the modified size of the at least one feature; and
    determining whether the sum of the difference value and the penalty value is reduced.
3. The method of any of clauses 1-2, wherein the determining the penalty value comprises:
    detecting a pattern of the initial patterning device pattern having features with sizes around the desired feature size;
    computing a binarized pattern of the detected pattern using a binarization function, the binarization function classifies features whose size fall in a given interval of the desired feature size;
    determining the penalty value based on a combination of the detected pattern and the binarized pattern, wherein the combination includes features of varying sizes.
4. The method of clause 3, wherein the detected patterns include features having sizes within a ±20% range of the desired feature size.
5. The method of clause 3, wherein the modifying the size of the at least one feature of the initial patterning device pattern comprises:
    increasing or decreasing the size of the at least one feature so that the sum of the difference value and the penalty value is reduced.
6. The method of clause 5, wherein the increasing the size of the at least one feature causes the sum of the difference value and the penalty value to be minimized.
7. The method of clause 5, wherein the decreasing the size of the at least one feature causes the sum of the difference value and the penalty value to be minimized.
8. The method of clause 7, wherein the decreasing the size of the at least one feature eliminates the at least one feature from the patterning device pattern.
9. The method of any of clauses 1-8, wherein the difference value between the predicted pattern and the target pattern is an edge placement error between a contour of a feature of the predicted pattern and another contour of the target pattern corresponding to the contour of the predicted pattern.
10. The method of any of clauses 1-9, wherein the initial patterning device pattern or the patterning device pattern is a curvilinear pattern.
11. The method of any of clauses 1-10, wherein modifying the patterning device pattern comprises optical proximity corrections comprising a placement of assist features and/or contour modification.
12. The method of any of clauses 1-11, wherein the initial patterning device pattern or the patterning device pattern is a pixelated image.
13. The method of clause 12, wherein the detecting pattern is based on image processing of the pixelated image of the initial patterning device pattern or the patterning device pattern.
14. The method of clause 13, wherein the detecting pattern comprises:
    convolving a kernel having a characteristic modulation distance with the pixelated image of the initial patterning device pattern, wherein the characteristic modulation distance corresponds to a range of value around a signal of the pixelated image.
15. The method of clause 14, wherein the signal is related to an intensity of a pixel of the pixelated image.
16. The method of clause 14, wherein the characteristic modulation distance is set to the desired feature size.
17. The method of clause 14, wherein the kernel is a Laplacian-of-Gaussian or a difference-of-Gaussian function.
18. The method of any of clauses 12-17, wherein the computing the binarized pattern is based on image processing of an image of the detected pattern.
19. The method of clause 18, wherein the computing the binarized pattern comprises:
    identifying pixels within the image of the detected patterns based on a binarization threshold value, where the binarization threshold value classifies a pixel location belonging to a feature within a given interval of the desired size of the at least one feature.
20. The method of clause 19, wherein the binarized function is a sigmoid
21. The method of clause 20, wherein the binarization threshold value is greater than 0.5.
22. The method of any of clauses 11-21, wherein the penalty value is a scalar value associated with a pixel of the pixelated patterning device pattern, wherein the pixel corresponds to the at least one feature being modified.
23. A non-transitory computer program product comprising machine-readable instructions for causing a processor to cause performance of the method of any of clauses 1-22.

The concepts disclosed herein may simulate or mathematically model any generic imaging system for imaging sub wavelength features, and may be especially useful with emerging imaging technologies capable of producing increasingly shorter wavelengths. Emerging technologies already in use include EUV (extreme ultra violet), DUV lithography that is capable of producing a 193 nm wavelength with the use of an ArF laser, and even a 157 nm wavelength with the use of a Fluorine laser. Moreover, EUV lithography is capable of producing wavelengths within a range of 20-5 nm by using a synchrotron or by hitting a material (either solid or a plasma) with high energy electrons in order to produce photons within this range.

While the concepts disclosed herein may be used for imaging on a substrate such as a silicon wafer, it shall be understood that the disclosed concepts may be used with any type of lithographic imaging systems, e.g., those used for imaging on substrates other than silicon wafers.

The descriptions above are intended to be illustrative, not limiting. Thus, it will be apparent to one skilled in the art that modifications may be made as described without departing from the scope of the claims set out below.

What is claimed is:

1. A method for determining a patterning device pattern, the method comprising:
    obtaining an initial patterning device pattern having at least one feature;
    applying a blob detection to the initial patterning device pattern; and
    determining, using a cost function based on a result of the blob detection, the patterning device pattern.

2. A non-transitory computer program product comprising machine-readable instructions therein, the instructions configured to cause a processor system to at least:
    obtain an initial patterning device pattern having at least one feature;
    apply a blob detection to the initial patterning device pattern; and
    determine, using a cost function based on a result of the blob detection, the patterning device pattern.

3. The computer program product of claim 2, wherein the instructions configured to cause the processor system to determine the patterning device pattern are configured to determine patterning device pattern in an iterative process, an iteration comprising:
    modification of a size of the at least one feature of the initial patterning device pattern; and
    determination of a penalty value corresponding to the modified size of the at least one feature.

4. The computer program product of claim 2, wherein the instructions configured to cause the processor system to apply the blob detection and determine the patterning device pattern are further configured to cause the processor system to:
    detect a pattern of the initial patterning device pattern having features with sizes around one or more desired feature sizes;
    compute a binarized pattern of the detected pattern using a binarization function, the binarization function classifies features whose size fall in a given interval of the one or more desired feature sizes; and
    determine a penalty of the cost function based on a combination of the detected pattern and the binarized pattern, wherein the combination includes features of varying sizes.

5. The computer program product of claim 2, wherein the initial patterning device pattern or the patterning device pattern is a curvilinear pattern.

6. The computer program product of claim 2, wherein the instructions configured to cause the processor system to determine the patterning device pattern are further configured to determine optical proximity corrections comprising a placement of assist features and/or contour modification.

7. The computer program product of claim 2, wherein the instructions configured to cause the processor system to apply the blob detection are further configured to convolve a kernel having a characteristic modulation distance with a pixelated image of the initial patterning device pattern, wherein the characteristic modulation distance corresponds to a range of value around a signal of the pixelated image.

8. The computer program product of claim 7, wherein the signal is related to an intensity of a pixel of the pixelated image.

9. The computer program product of claim 7, wherein the characteristic modulation distance is set to one or more desired feature sizes.

10. The computer program product of claim 7, wherein the kernel is a Laplacian-of-Gaussian or a difference-of-Gaussian function.

11. A non-transitory computer program product comprising machine-readable instructions therein, the instructions configured to cause a processor system to at least:
    obtain a pixelated patterning device pattern image;
    convolve a kernel having a characteristic modulation distance with the pixelated patterning device pattern image, wherein the characteristic modulation distance corresponds to a range of value around a signal of the pixelated image; and
    determine, using a cost function based on a result of the convolution, a patterning device pattern.

12. The computer program product of claim 11, wherein the cost function has a penalty related to manufacturability of at least one feature of the patterning device pattern.

13. The computer program product of claim 11, wherein the characteristic modulation distance is related to one or more desired feature sizes.

14. The computer program product of claim 11, wherein the kernel is a Laplacian-of-Gaussian or a difference-of-Gaussian function.

15. The computer program product of claim 11, wherein the signal is related to an intensity of a pixel of the pixelated image.

16. A non-transitory computer program product comprising machine-readable instructions therein, the instructions configured to cause a processor system to at least:
    detect a pattern of a patterning device pattern having features with sizes around one or more desired feature sizes;
    compute a binarized pattern of the detected pattern using a binarization function, the binarization function classifies features whose size fall in a given interval of the desired feature size; and
    modify, using a cost function based on a result of the computation, the patterning device pattern.

17. The computer program product of claim 16, wherein the cost function has a penalty related to manufacturability of at least one feature of the patterning device pattern.

18. The computer program product of claim 16, wherein the instructions configured to cause the processor system to detect the pattern are further configured to convolve a kernel having a characteristic modulation distance with a pixelated image of the patterning device pattern, wherein the characteristic modulation distance corresponds to a range of value around a signal of the pixelated image.

19. The computer program product of claim 16, wherein the signal is related to an intensity of a pixel of the pixelated image.

20. The computer program product of claim 16, wherein the patterning device pattern is a curvilinear pattern.

* * * * *